US012279222B1

(12) United States Patent
Yu

(10) Patent No.: US 12,279,222 B1
(45) Date of Patent: Apr. 15, 2025

(54) METHOD FOR OPERATING UE ASSOCIATED WITH S-NSSAI

(71) Applicant: Metapex Inc., Seoul (KR)

(72) Inventor: Sang Geun Yu, Seoul (KR)

(73) Assignee: Metapex Inc., Seoul (KR)

( * ) Notice: Subject to any disclaimer, the term of this patent is extended or adjusted under 35 U.S.C. 154(b) by 0 days.

(21) Appl. No.: 18/943,356

(22) Filed: Nov. 11, 2024

(30) Foreign Application Priority Data

Apr. 24, 2024 (KR) ................. 10-2024-0054710
Nov. 6, 2024 (KR) ................. 10-2024-0156276

(51) Int. Cl.
*H04W 60/04* (2009.01)
*H04W 48/18* (2009.01)
*H04W 60/06* (2009.01)

(52) U.S. Cl.
CPC ........... *H04W 60/04* (2013.01); *H04W 48/18* (2013.01); *H04W 60/06* (2013.01)

(58) Field of Classification Search
CPC ...... H04W 60/04; H04W 48/18; H04W 60/06
See application file for complete search history.

(56) References Cited

U.S. PATENT DOCUMENTS

| 11,848,744 | B2 * | 12/2023 | Ryu | ................. | H04B 7/19 |
| 2022/0272660 | A1 * | 8/2022 | Luetzenkirchen | .... | H04W 68/02 |
| 2022/0286993 | A1 * | 9/2022 | Youn | ................. | H04W 8/06 |
| 2023/0337122 | A1 * | 10/2023 | Tamura | ................. | H04W 60/04 |

FOREIGN PATENT DOCUMENTS

| WO | WO-2024172623 | A1 * | 8/2024 |
| WO | WO-2024210511 | A2 * | 10/2024 |
| WO | WO-2024210592 | A1 * | 10/2024 |

\* cited by examiner

*Primary Examiner* — Julio R Perez
(74) *Attorney, Agent, or Firm* — Bridgeway IP Law Group, PLLC; Jihun Kim

(57) ABSTRACT

According to one embodiment of this specification, there is provided a method. The method may comprise: receiving a Registration Accept message or UE Configuration Update Command message. The Registration Accept message or UE Configuration Update Command message includes at least one of a slice deregistration inactivity timer and validity time for one or more Single Network Slice Selection Assistance Information (S-NSSAI). The method may comprise: starting a first timer based on the slice deregistration inactivity timer. If the first timer expires, the UE locally removes the S-NSSAI from the Allowed NSSAI. If UE does not trigger Mobility Registration Update and Allowed NSSAI becomes empty after expiry of the validity time, then the UE enters deregistered state implicitly.

12 Claims, 14 Drawing Sheets

METHOD FOR OPERATING UE ASSOCIATED WITH S-NSSAI

CROSS-REFERENCE TO RELATED APPLICATIONS

This application claims the priority of Korean Patent Applications No. 10-2024-0054710 filed on Apr. 24, 2024 and No. 10-2024-0156276 filed on Nov. 6, 2024, in the Korean Intellectual Property Office, the disclosure of which is incorporated herein by reference.

BACKGROUND OF THE DISCLOSURE

Field of the Disclosure

The present disclosure relates to a mobile communication.

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The 5G mobile communication supports a plurality of numerologies or subcarrier spacing (SCS) for supporting various services. For example, when the SCS is 15 kHz, a wide area over conventional cellular bands is supported; in the case of 30 kHz/60 kHz, a dense urban area, lower latency, and wider carrier bandwidth is supported; and when the SCS is larger than 60 kHz or higher, bandwidth larger than 24.25 GHz is supported to overcome phase noise.

The NR frequency band is defined by two types (FR1, FR2) of frequency ranges. The FR1 ranges from 410 MHz to 7125 MHz, and the FR2 ranges from 24250 MHz to 52600 MHz, which may correspond to the millimeter wave (mmW) range.

For the convenience of descriptions, in the frequency range used for the NR system, the FR1 may indicate the "sub-6 GHz range" while the FR2 may indicate the "above 6 GHz range" and may be referred to as the millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical values of the frequency ranges in the NR system may be changed. For example, the FR1 may include a frequency band ranging from 410 MHz to 7125 MHz as shown in Table 2. In other words, the FR1 may include a frequency band higher than 6 GHz (or 5850, 5900, or 5925 MHz). For example, a frequency band higher than 6 GHz (or 5850, 5900, or 5925 MHz) included in the FR1 may include the unlicensed band. The unlicensed band may be utilized for various applications, which may include communication for vehicles (for example, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU proposes three usage scenarios, e.g., eMBB (enhanced Mobile BroadBand), mMTC (massive Machine Type Communication), and URLLC (Ultra Reliable and Low Latency Communications).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, it is urgently required to re-design the core network in 5G mobile communication.

FIG. 1 illustrates a structure of the next-generation mobile communication network.

The 5G Core (5GC) may include various constituting elements, and FIG. 1 shows Access and Mobility Management Function (AMF) 41, Session Management Function (SMF) 42, Policy Control Function (PCF) 43, User Plane Function (UPF) 44, Application Function (AF) 45, Unified Data Management (UDM) 46, and Non-3GPP InterWorking Function (N3IWF) 49, which correspond to part of the constituting elements.

The UE 10 is connected to the data network via the UPF 44 through the Next Generation Radio Access Network (NG-RAN).

The UE 10 may receive a data service even through untrusted non-3rd Generation Partnership Project (3GPP) access, for example, Wireless Local Area Network (WLAN). To connect the non-3GPP access to the core network, the N3IWF 49 may be deployed.

FIG. 2 shows an example of an expected structure of next-generation mobile communication from a node perspective.

As can be seen with reference to FIG. 2, a UE is coupled to a data network (DN) via a next generation radio access network (RAN).

The illustrated control plane function (CPF) node performs the entirety or part of a mobility management entity (MME) function of 4G mobile communication and the entirety or part of a control plane function of an S-serving gateway (SG) and PDN gateway (P-GW). The CPF node includes an access and mobility management function (AMF) and a session management function (SMF).

The illustrated user plane function (UPF) node is a type of a gateway through which user data is transmitted/received. The UPF node may perform the entirety or part of a user plane function of an S-GW or P-GW of 4G mobile communication.

The illustrated policy control function (PCF) is a node which controls a provider's policy.

The illustrated application function (AF) is a server for providing several services to the UE.

The illustrated unified data management (UDM) is a type of a server which manages subscriber information, such as a home subscriber server (HSS) of 4G mobile communication. The UDM stores the subscriber information in a unified data repository (UDR) and manages it.

The illustrated authentication server function (AUSF) authenticates and manages the UE.

The illustrated network slice selection function (NSSF) is a node for network slicing as described below.

In FIG. 2, the UE can simultaneously access two data networks by using multiple protocol data unit or packet data unit (PDU) sessions.

FIG. 3 shows an example of an architecture for supporting simultaneous access to two data networks.

In the architecture shown in FIG. 3, a UE uses one PDU session to simultaneously access the two data networks.

Reference points shown in FIGS. 2 and 3 are as follows.

N1 represents a reference point between the UE and the AMF.

N2 represents a reference point between the (R)AN and the AMF.

N3 represents a reference point between the (R)AN and the AMF.

N4 represents a reference point between the SMF and the UPF.

N5 represents a reference point between the PCF and the AF.

N6 represents a reference point between the UPF and the DN.

N7 represents a reference point between the SMF and the PCF.

N8 represents a reference point between the UDM and the AMF.

N9 represents a reference point between the UPFs.

N10 represents a reference point between the UDM and the SMF.

N11 represents a reference point between the AMF and the SMF.

N12 represents a reference point between the AMF and the AUSF.

N13 represents a reference point between the UDM and the AUSF.

N14 represents a reference point between the AMFs.

N15 represents a reference point between the PCF and the AMF.

N16 represents a reference point between the SMFs.

N22 represents a reference point between the AMF and the NSSF.

FIG. 4 illustrates another example of a structure of a radio interface protocol between a UE and a gNB.

The radio interface protocol is based on the 3GPP radio access network specification. The radio interface protocol horizontally includes a physical layer, a data link layer, and a network layer; and is divided vertically into a user plane for data information transfer and a control plane for signaling transfer.

The protocol layers may be divided into a first layer (L1), a second layer (L2), and a third layer (L3) based upon the lower three layers of the Open System Interconnection (OSI) reference model widely used for communication systems.

In what follows, each layer of the radio interface protocol will be described.

The physical layer, namely the first layer, provides an information transfer service by using a physical channel. The physical layer is connected to a Medium Access Control (MAC) layer, namely, an upper layer of the physical layer, via a transport channel. Data is transferred between the MAC layer and the physical layer through the transport channel. In addition, data is transferred between different physical layers, namely, between physical layers of a transmitting side and a receiving side, through the physical channel.

The second layer includes the MAC layer, a Radio Link Control (RLC) layer, and a Packet Data Convergence Protocol (PDCP) layer.

The third layer include a Radio Resource Control (hereinafter, simply referred to as RRC). The RRC layer is defined only in the control plane and serves to control the logical channel, the transport channel, and the physical channel in association with configuration, re-configuration, and release of radio bearers (hereinafter, RBs for short). In this case, the RB represents a service provided by the second layer for data transfer between the UE and the E-UTRAN.

The Non-Access Stratum (NAS) layer performs a function such as connection management (session management) and mobility management.

The NAS layer is divided into a NAS entity for Mobility Management (MM) and a NAS entity for Session Management (SM).

1) The NAS entity for MM provides the following typical function.

The following are included as a NAS procedure related to the AMF.

Registration management and access management procedure: The AMF supports the following function.

Reliable NAS signal connectivity (integrity protection, encryption) between the UE and the AMF 2) The NAS entity for SM performs session management between the UE and the SMF.

An SM signaling message is processed, namely, generated and processed, in a NAS-SM layer of the UE and the SMF. Content of the SM signaling message is not interpreted by the AMF.

In the case of SM signaling transmission,

The NAS entity for MM generates a NAS-MM message to induce a location and method for transferring an SM signaling message through a security header indicating NAS transmission of SM signaling and additional information for NAS-MM to be received.

In the case of receiving SM signaling, the NAS entity for SM performs integrity checking of the NAS-MM message and interprets additional information to induce a place and a method for deriving an SM signaling message.

Meanwhile, in FIG. 4, an RRC layer, and RLC layer, a MAC layer, and a PHY layer located below the NAS layer are collectively called an access stratum (AS) layer.

A network system (namely 5GC) for the next generation mobile communication (namely 5G) also supports non-3GPP access. A typical example of the non-3GPP access is WLAN access. The WLAN access may include both trusted and untrusted WLANs.

In the 5G system, the AMF performs not only 3GPP access but also Registration Management (RM) and Connection Management (CM) for non-3GPP access.

SUMMARY OF THE DISCLOSURE

The disclosure of this specification aims to provide a method for handling PDU sessions related to S-NSSAI.

According to one embodiment of this specification, there is provided a method performed by a user equipment (UE). The method may comprise: receiving a Registration Accept message or UE Configuration Update Command message. The Registration Accept message or UE Configuration Update Command message may include at least one of a slice deregistration inactivity timer and validity time for one or more Single Network Slice Selection Assistance Information (S-NSSAI). The method may comprise: starting a first timer based on the slice deregistration inactivity timer. If the first timer expires, the UE may locally remove the S-NSSAI from the Allowed NSSAI. If UE does not trigger a Mobility Registration Update and an Allowed NSSAI becomes empty after expiry of the validity time, then the UE may enter deregistered state implicitly.

According to one embodiment of this specification, there is also provided a user equipment (UE). The UE may comprise: a transceiver; and a processor configured to control the transceiver thereby performing steps including: receiving a Registration Accept message or UE Configuration Update Command message. The Registration Accept message or UE Configuration Update Command message may include at least one of a slice deregistration inactivity timer and validity time for one or more Single Network Slice Selection Assistance Information (S-NSSAI). The steps may include: starting a first timer based on the slice deregistration inactivity timer. If the first timer expires, the UE may locally remove the S-NSSAI from the Allowed NSSAI. If UE does not trigger a Mobility Registration Update and an Allowed NSSAI becomes empty after expiry of the validity time, then the UE may enter deregistered state implicitly.

According to one embodiment of this specification, there is also provided a semiconductor chipset equipped into a user equipment (UE). The semiconductor chipset may comprise: at least one processor; and at least one memory capable of storing instructions and being connected electrically to the at least one processor operably. An operation, performed when the instructions are executed by the at least one processor, includes: receiving a Registration Accept message or UE Configuration Update Command message. The Registration Accept message or UE Configuration Update Command message may include at least one of a slice deregistration inactivity timer and validity time for one or more Single Network Slice Selection Assistance Information (S-NSSAI). The operation may include: starting a first timer based on the slice deregistration inactivity timer. If the first timer expires, the UE locally removes the S-NSSAI from the Allowed NSSAI. If the UE does not trigger a Mobility Registration Update and an Allowed NSSAI becomes empty after expiry of the validity time, then the UE enters deregistered state implicitly.

The slice deregistration inactivity timer may be set per access type.

The first timer based on the slice deregistration inactivity timer may be started a) when the Network Slice is added to the Allowed NSSAI and there are no Protocol data unit (PDU) Sessions associated with the Network Slice over a corresponding access type or b) when a last PDU Session associated with the Network Slice over a same access type is released.

The method, steps or the operation may further comprise: stopping or resetting the first timer when at least one PDU Session associated with the Network Slice is successfully established or the Network Slice is removed from the Allowed NSSAI.

According to the disclosure of this specification, there is provided a procedure related to S-NSSAI.

DESCRIPTION OF EXEMPLARY EMBODIMENTS

Figure 1:
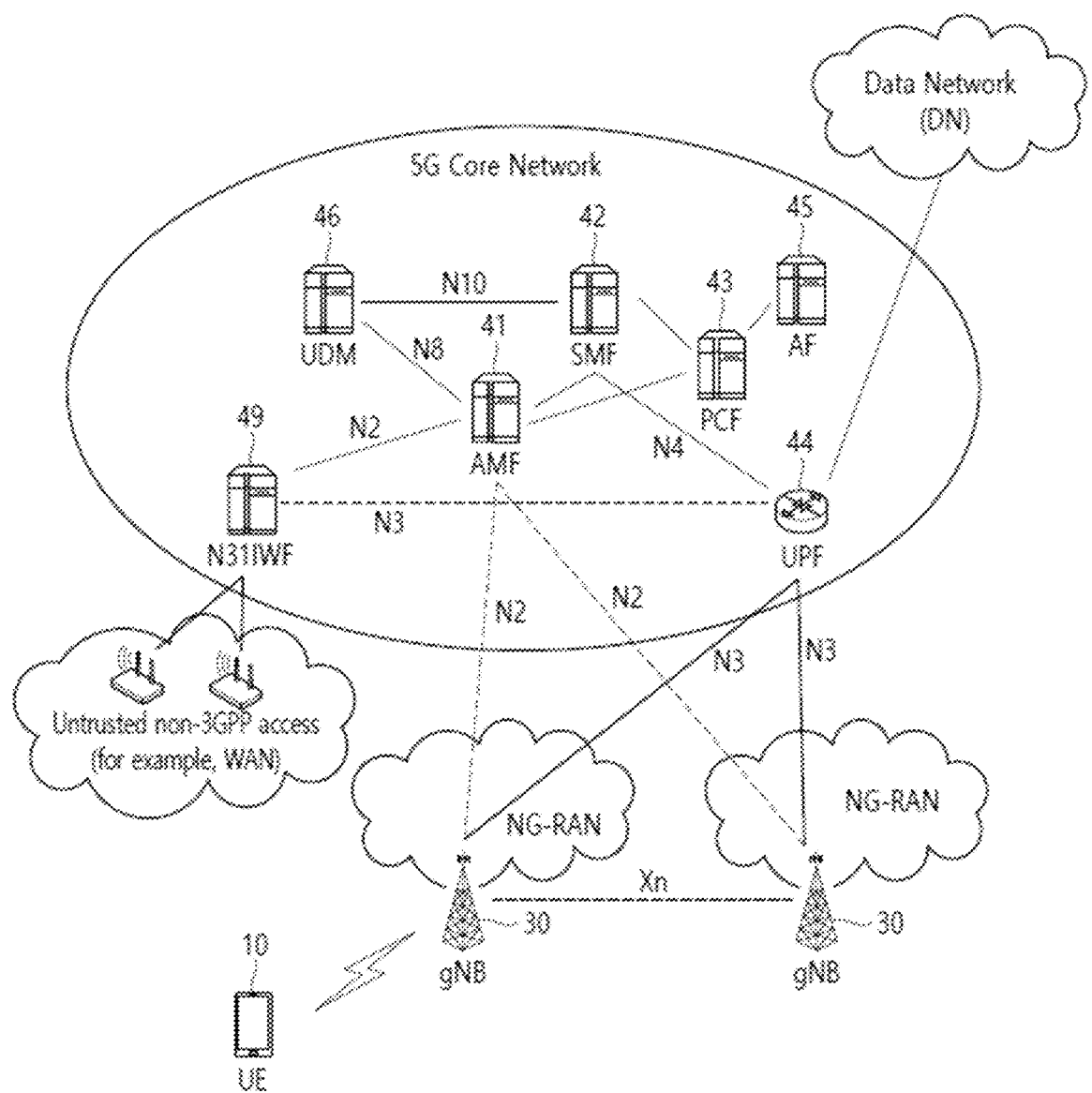
FIG. 1 illustrates a structure of the next generation mobile communication network.
Figure 2:
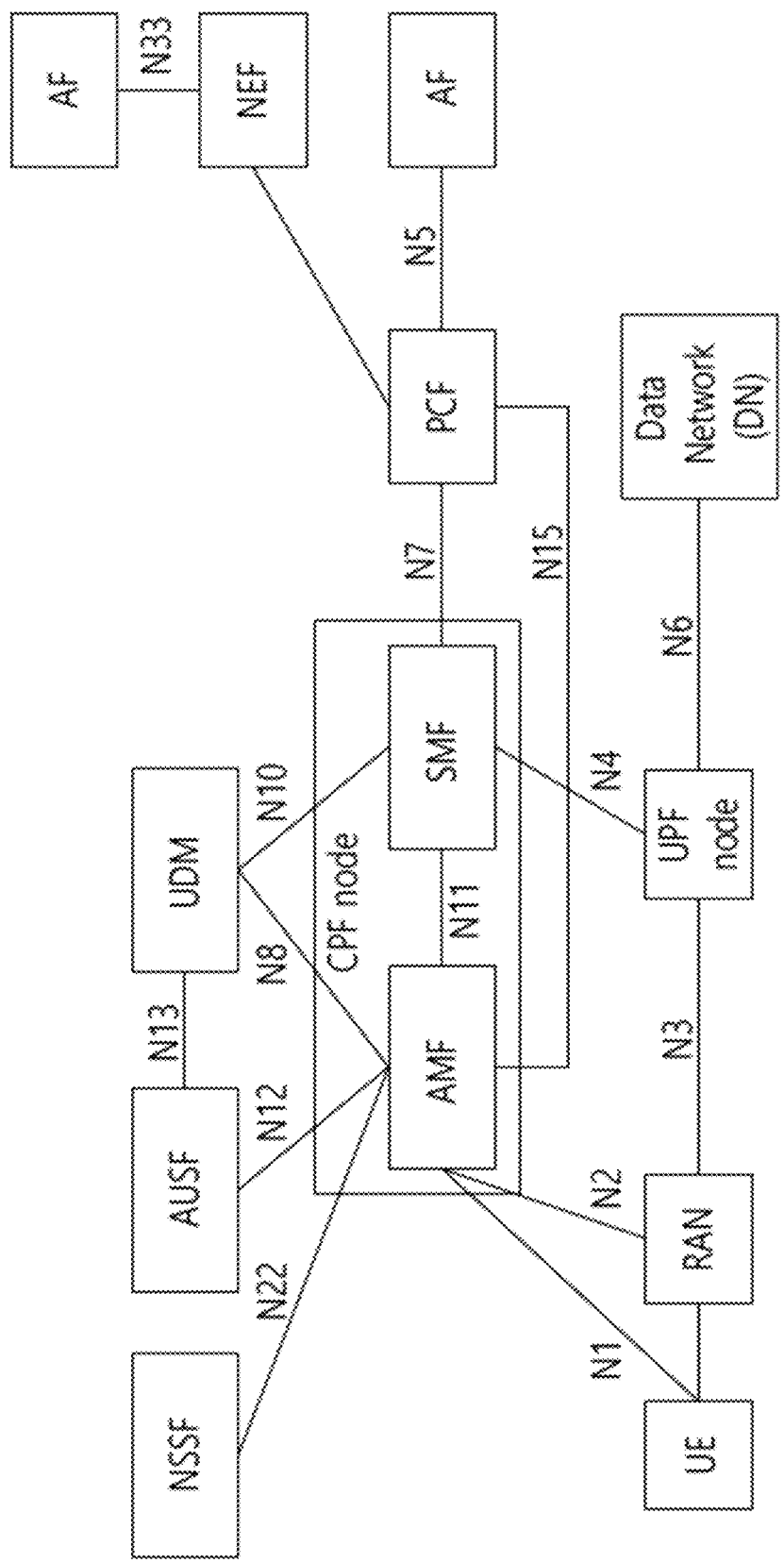
FIG. 2 illustrates an expected structure of the next generation mobile communication from the perspective of a node.
Figure 3:
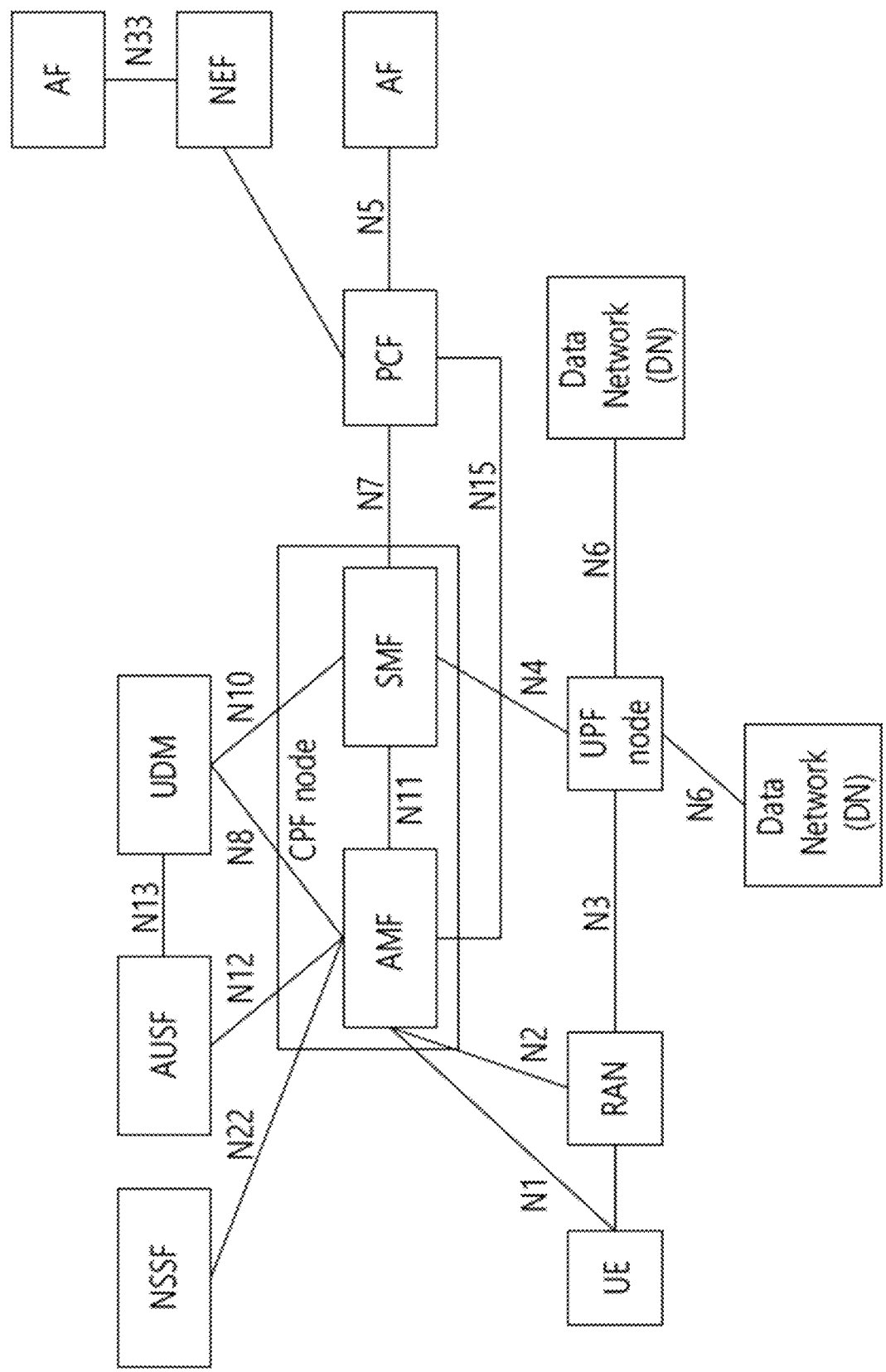
FIG. 3 illustrates an architecture for supporting simultaneous accesses to two data networks.
Figure 4:
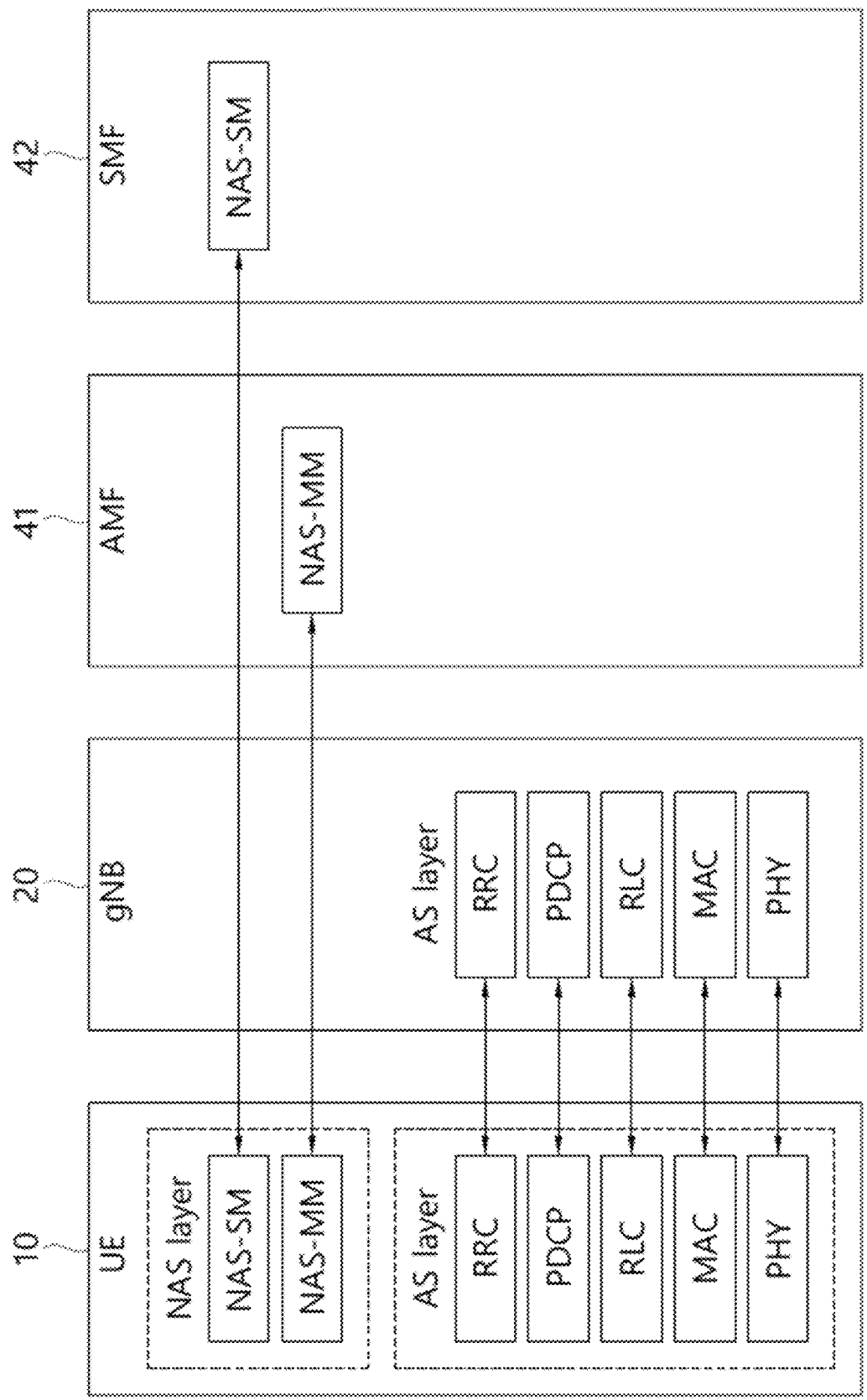
FIG. 4 illustrates a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

The expression "A or B" as used in the present disclosure may mean "only A", "only B" or "both A and B". In other words, "A or B" may be interpreted as "A and/or B" in the present disclosure. For example, in the present disclosure, "A, B or C" may mean "only A", "only B", "only C" or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B or C".

The phrase "at least one of A and B" as used in the present disclosure may mean "only A", "only B", or "both A and B". Also, the expression "at least one of A or B" or "at least one of A and/or B" may be interpreted to be the same as "at least one of A and B".

Also, the phrase "at least one of A, B and C" as used in the present disclosure may mean "only A", "only B", or "any combination of A, B and C". Also, the phrase "at least one of A, B or C" or "at least one of A, B and/or C" may mean "at least one of A, B and C".

Also, parentheses used in the present disclosure may mean "for example". More specifically, a phrase is written as "control information (PDCCH)", it may mean that "PDCCH" is proposed as one example of "control information". In other words, "control information" of the present disclosure is not limited to "PDCCH", but it may be interpreted that "PDCCH" is proposed as one example of "control information". Also, when a phrase is written as "control information (namely, PDCCH)", it may be interpreted that "PDCCH" is proposed as one example of "control information".

Technical features described individually in one figure of the present disclosure may be implemented separately or simultaneously.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

<Registration Procedure>

In order to enable mobility tracking and data reception, and receive a service, a UE may need to be authorized. To this end, the UE needs to be registered in a network. The registration procedure is performed when the UE needs to perform initial registration with respect to a 5G system. In addition, the registration procedure is performed when the UE performs periodic registration update, when the UE moves to a new tracking area (TA) in an idle mode, and when the UE needs to perform periodic registration update.

During the initial registration procedure, ID of the UE may be obtained from the UE. The AMF may transmit PEI (IMEISV) to the UDM, the SMF, and the PCF.

Figure 5A:
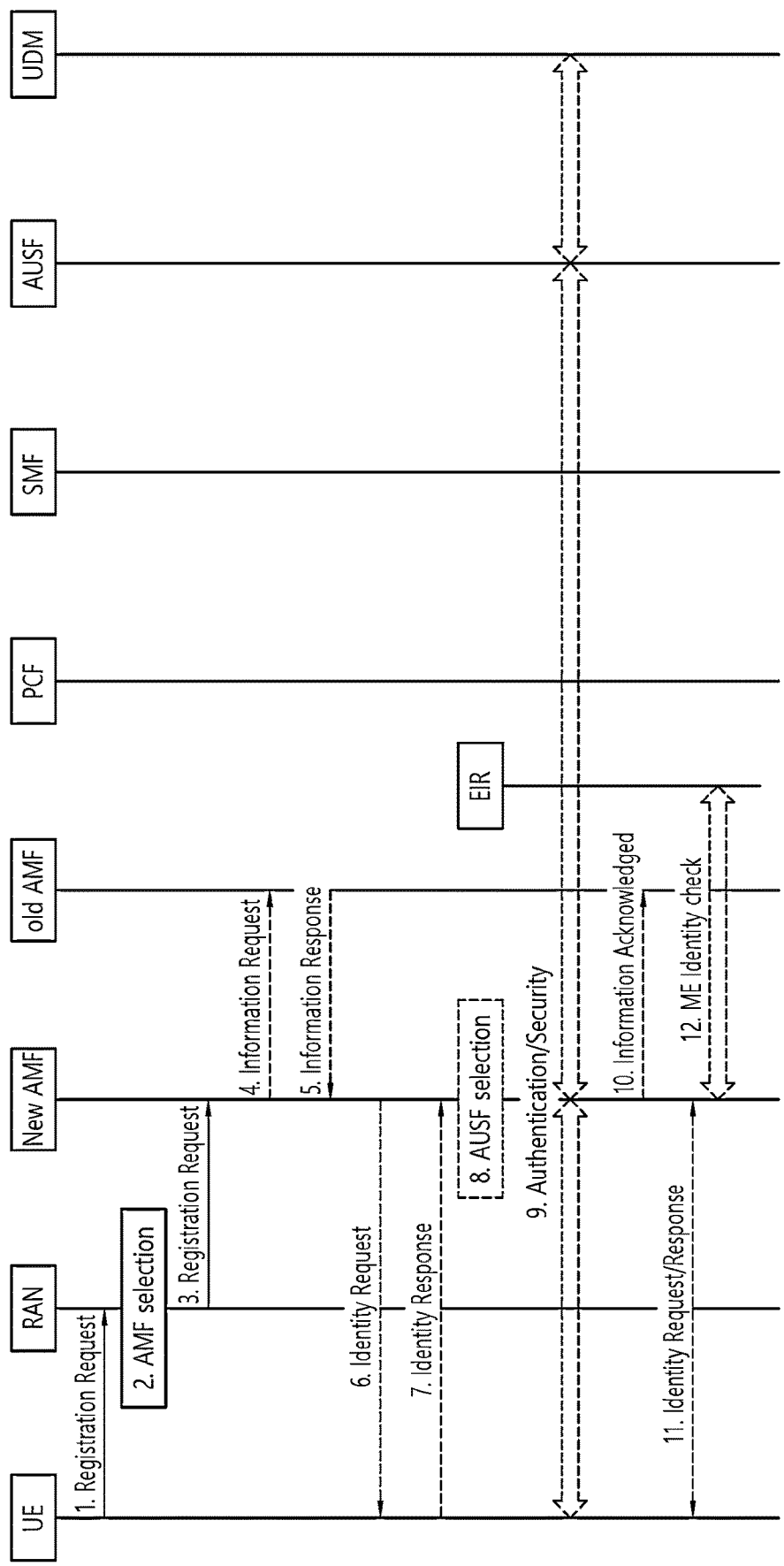
FIGS. 5a and 5b are signal flows of an exemplary registration procedure.
Figure 5B:
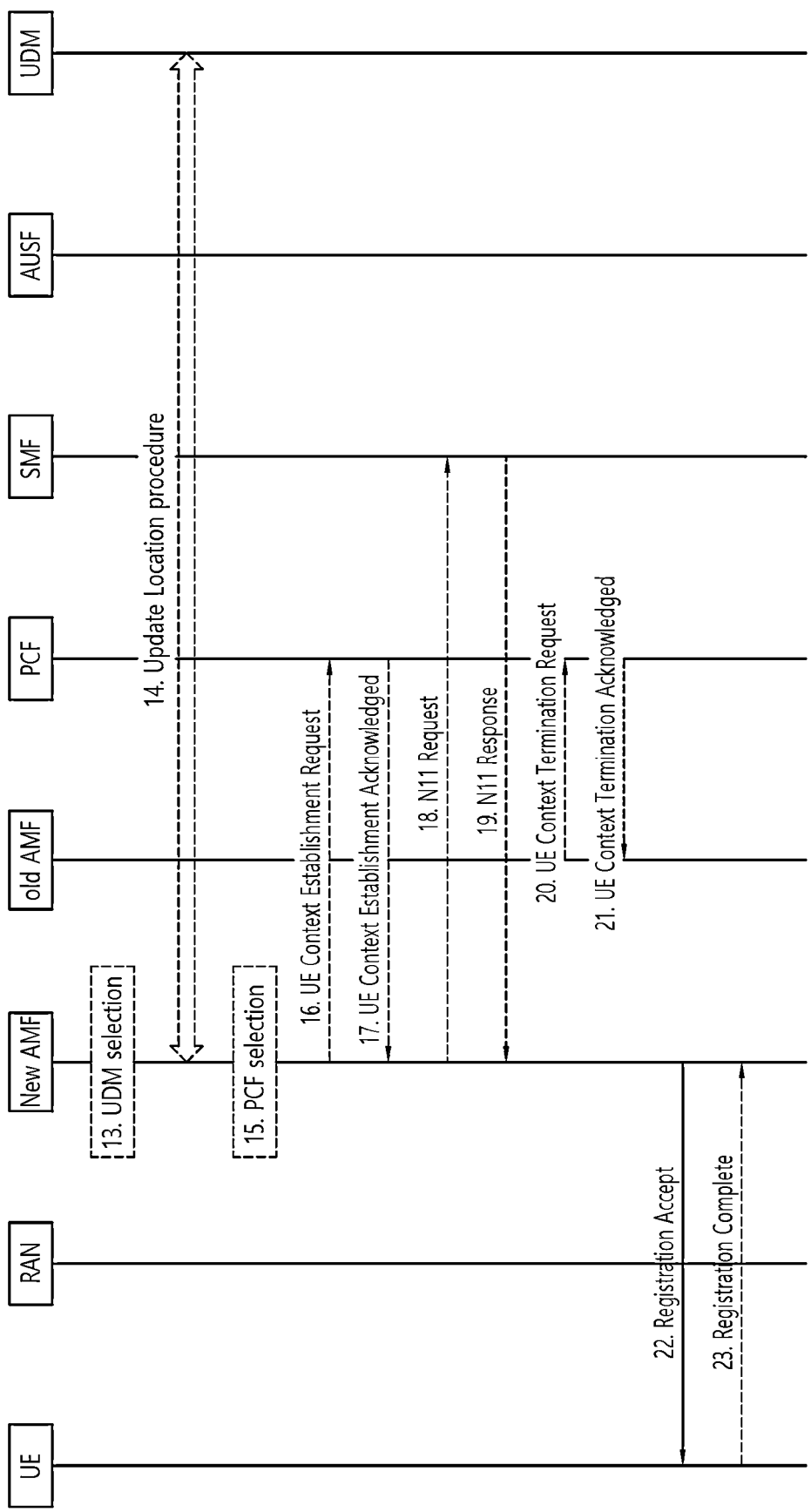

FIGS. 5a and 5b are signal flows of an exemplary registration procedure.

The UE may transmit an AN message to the RAN. The AN message may include an AN parameter and a registration request message. The registration request message may include information such as a registration type, a subscription permanent ID or a temporary user ID, a security parameter, Network Slice Selection Assistance Information (NSSAI), 5G capability of the UE, and a Protocol Data Unit (PDU) session state.

In the case of 5G RAN, the AN parameter may include a Subscription Permanent Identifier (SUPI) or a temporary user ID, a selected network, and NSSAI.

The registration type may indicate which state the UE is currently in among "initial registration" (namely, the UE is in a non-registered state), "mobility registration update" (namely, the UE is in a registered state and starts a registration procedure due to expiration of a periodic update timer), or "periodic registration update" (namely, the UE is in a registered state and starts a registration procedure due to expiration of a periodic update timer). If a temporary user ID is included, the temporary user ID represents the last serving AMF. If the UE has already been registered via non-3GPP access in a PLMN different from the PLMN of the 3GPP access, a temporary ID for the UE assigned by the AMF may not be provided while the UE performs the registration procedure via non-3GPP access.

The security parameter may be used for authentication and integrity protection.

The PDU session state may indicate a (previously established) PDU session available for the UE.

2) When SUPI is included or the temporary user ID does not indicate a valid AMF, the RAN may select an AMF based on (R)AT and NSSAI.

When the (R)AN is unable to select an appropriate AMF, an AMF is selected in a random fashion according to a local policy, and a registration request is forwarded to the selected AMF. If the selected AMF is unable to service the UE, the selected AMF selects another AMF that is more appropriate for the UE.

3) The RAN transmits an N2 message to the new AMF. The N2 message includes an N2 parameter and a registration request. The registration request may include a registration type, a subscription permanent ID or a temporary user ID, a security parameter, NSSAI, and MICO mode default configuration.

When 5G-RAN is used, the N2 parameter includes location information, cell identifier, and RAT type associated with the cell the UE is camping on.

If the registration type indicated by the UE is a periodic registration update, steps 4 to 17 to be described below may not be performed.

4) The newly selected AMF may transmit an information request message, e.g., Namf_Communication_UEContext-Transfer to the previous AMF.

If the temporary user ID of the UE is included in a registration request message and the serving AMF has changed since the last registration, the new AMF may transmit, to the previous AMF, an information request message including complete registration request information for requesting SUPI and MM context of the UE.

5) The previous AMF transmits an information response message, e.g., Namf_Communication_UEContextTransfer response to the newly selected AMF. The information response message may include SUPI, MM context, and SMF information.

Specifically, the previous AMF transmits an information response message including SUPI and MM context of the UE.

If the previous AMF has information on an active PDU session, the previous AMF may include SMF information including the ID of the SMF and a PDU session ID within the information response message.

6) The new AMF transmits an Identity Request message to the UE if SUPI is not provided by the UE or is not retrieved from the previous AMF.

7) The UE transmits an Identity Response message including the SUPI to the new AMF.

8) The AMF may decide to trigger an AUSF. In this case, the AMF may select an AUSF based on the SUPI.

9) The AUSF may start authentication of the UE and a NAS security function.

10) The new AMF may transmit a Namf_Communication_RegistrationCompleteNotify message to the previous AMF.

The new AMF may transmit an Identity Request message to the UE.

If PEI has not been provided by the UE or has not been retrieved from the previous AMF, an Identity Request message may be transmitted so that the AMF may search for the PEI.

12) The new AMF checks the ME identifier.

13) If step 14 described below is performed, the new AMF selects the UDM based on the SUPI.

14) The new AMF performs a registration procedure with UDM.

15) The new AMF may select a PCF based on the SUPI.

16) The new AMF performs Policy Association Establishment with the PCF.

17) The new AMF sends a PDU Session Update SM Context message or a PDU Session Release SM Context message to the SMF.

18-19) The new SMF sends an AMF Mobility Request message to the N3IWF and receives a Mobility Response message from the AMF.

20) The previous AMF transmits a UE Context Termination Request message to the PCF.

If the previous AMF has previously requested the UE context to be established in the PCF, the previous AMF may delete the UE context from the PCF.

21) The new AMF sends a Registration Accept message to the UE. The Registration Accept message may include a temporary user ID, registration area, mobility restrictions, PDU session status, NSSAI, periodic registration update timer, and allowed MICO mode.

When the AMF allocates a new temporary user ID, the temporary user ID may be further included in the registration accept message. When mobile restriction is applied to the UE, information indicating mobility restriction may be additionally included in the registration accept message. The AMF may include information indicating the PDU session state of the UE in the registration accept message. The UE may remove any internal resource associated with the PDU session not indicated as being active in a received PDU session state. If PDU session state information is included in the Registration Request, the AMF may include information indicating the PDU session state to the UE within the registration accept message.

22) The UE transmits a registration complete message to the new AMF.

<PDU Session Establishment Procedure>

There are two types of Protocol Data Unit (PDU) session establishment procedures as follows.

A PDU session establishment procedure initiated by a UE

A PDU session establishment procedure initiated by a network. To this end, the network may transmit a device trigger message to an application(s) of the UE.

Figure 6A:
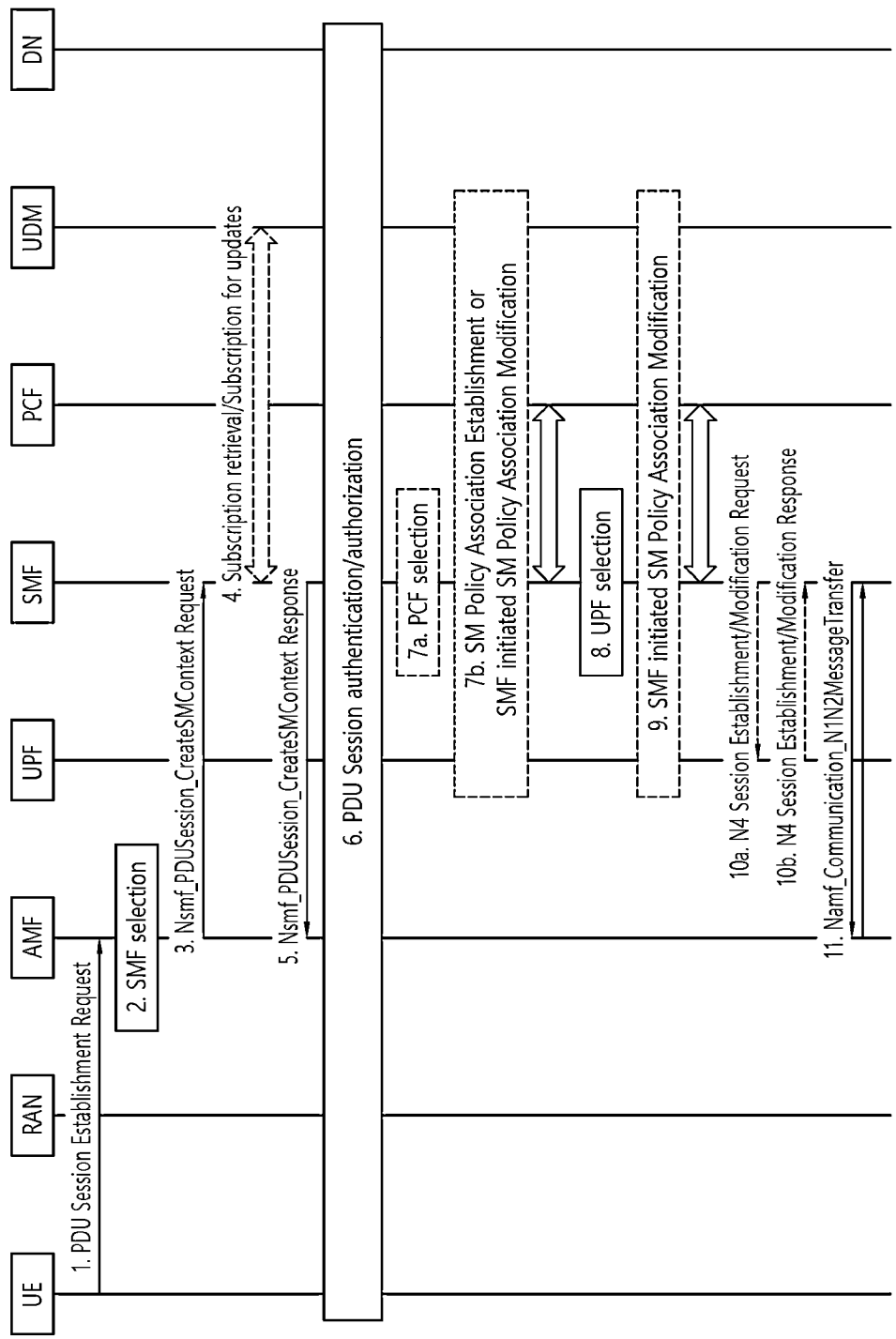
FIGS. 6a and 6b are signal flows of an exemplary PDU session establishment procedure.
Figure 6B:
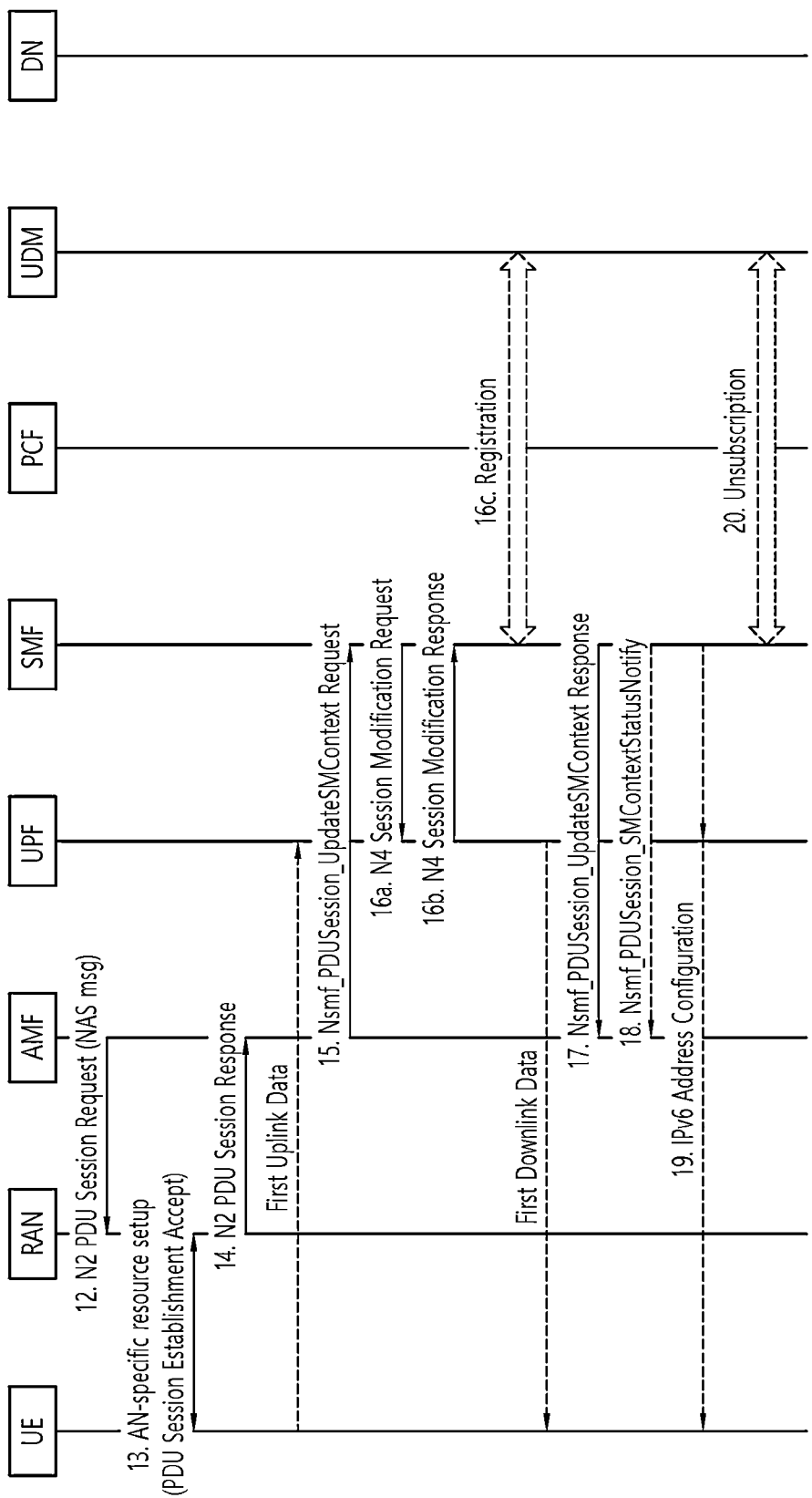

FIGS. 6a and 6b are signal flows of an exemplary PDU session establishment procedure.

The procedures shown in FIGS. 6a and 6b assume that the UE has already registered for the AMF according to the registration procedure described with reference to FIG. 5. Therefore, it is assumed that the AMF has already obtained user subscription data from the UDM.

1) The UE transmits a NAS message to the AMF. The message may include Session Network Slice Selection Assistance Information (S-NSSAI), DNN, PDU session ID, request type, and N1 SM information.

Specifically, the UE includes S-NSSAI from allowed NSSAI of a current access type. If information on the mapped NSSAI has been provided to the UE, the UE may provide both S-NSSAI based on the allowed NSSAI and the corresponding S-NSSAI based on the mapped NSSAI.

Here, the mapped NSSAI is S-NSSAI of the allowed NSSAI mapped to S-NSSAI of NSSAI configured for an HPLMN.

More specifically, the UE may extract and store allowed S-NSSAI and the mapped S-NSSAI, which are included in the registration accept message received from the network (namely, AMF) in the registration procedure of FIG. 5. Therefore, the UE may transmit the PDU Session Establishment Request message by including both S-NSSAI based on the allowed NSSAI and the corresponding S-NSSAI based on the mapped NSSAI therein.

To establish a new PDU session, the UE may generate a new PDU session ID.

The UE may start the PDU session establishment procedure initiated by the UE by transmitting a NAS message that includes the PDU Session Establishment Request message in the N1 SM information. The PDU Session Establishment Request message may include a request type, a Session and Service Continuity (SSC) mode, and a protocol configuration option.

If PDU session establishment is intended for establishing a new PDU session, the request type represents an "initial request". However, if there is an existing PDU session between 3GPP access and non-3GPP access, the request type may represent an "existing PDU session".

A NAS message transmitted by the UE is encapsulated in an N2 message by the AN. The N2 message may be transmitted to the AMF and include user location information and access technology type information.

The N1 SM information may include an SM PDU DN request container that includes information on PDU session authentication by an external DN.

2) If the request type is the "initial request" and the PDU session ID has not been used for an existing PDU session of the UE, the AMF may determine that the message corresponds to a request for a new PDU session.

If the NAS message does not include S-NSSAI, the AMF may determine default S-NSSAI on a PDU session requested according to UE subscription. The AMF may associate and store the PDU session ID with the SMF ID.

The AMF may select SMF.

3) The AMF may transmit an Nsmf_PDUSession_CreateSMContext request message or an Nsmf_PDUSession_UpdateSMContext request message to the selected SMF.

The Nsmf_PDUSession_CreateSMContext request message is SUPI, DNN, S-NSSAI(s), PDU Session ID, AMF ID, Request Type, PCF ID, Priority Access, N1 SM container, User location information, Access Type, PEI, GPSI, UE presence in It may include LADN service area, Subscription For PDU Session Status Notification, DNN Selection Mode, and Trace Requirements. The SM container may include a PDU Session Establishment request message.

The Nsmf_PDUSession_UpdateSMContext request message may include SUPI, DNN, S-NSSAI(s), SM Context ID, AMF ID, Request Type, N1 SM container, User location information, Access Type, RAT type, and PEI. The N1 SM container may include a PDU Session Establishment request message.

The AMF ID is used to identify the AMF serving the UE. The N1 SM information may include a PDU session establishment request message received from the UE.

4) SMF transmits a subscriber data request message to UDM. The subscriber data request message may include a subscriber permanent ID and DNN. UDM can transmit subscription data response message to SMF In step 3 above, if the request type indicates "existing PDU session", the SMF determines that the request is due to handover between 3GPP access and non-3GPP access. The SMF can identify an existing PDU session based on the PDU session ID.

If the SMF has not yet retrieved the SM-related subscription data for the DNN-related UE, the SMF may request subscription data.

The subscription data may include information on an authenticated request type, an authenticated SSC mode, and a basic QoS profile.

The SMF can check whether the UE request complies with the user subscription and local policy. Alternatively, the SMF rejects the UE request through NAS SM signaling (including the related SM rejection cause) delivered by the AMF, and the SMF informs the AMF that the PDU session ID should be considered to be released.

5) The SMF transmits the Nsmf_PDUSession_CreateSMContext Response message or the Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF receives the Nsmf_PDUSession_CreateSMContext request message, and the SMF can process the PDU Session establishment request message, the SMF SM context is created and the SM context ID is transmitted to the AMF.

6) Secondary authentication/authorization is selectively performed.

7a) When the working PCC is used for the PDU session, the SMF selects the PCF.

7b) The SMF performs an SM policy association establishment procedure in order to establish an SM policy association with the PCF.

8) If the request type of step 3 indicates "initial request", the SMF selects the SSC mode for the PDU session. If step 5 is not performed, the SMF may also select UPF. In case of request type IPv4 or IPv6, SMF can allocate IP address/prefix for PDU session.

9) The SMF performs the SM policy association modification procedure, and provides information on the policy control request trigger and conditions.

10) The request type indicates "initial request", and the SMF starts the N4 session establishment procedure using the selected UPF, otherwise it can start the N4 session modification procedure using the selected UPF.

10a) The SMF transmits an N4 session establishment/modification request message to the UPF. In addition, the SMF may provide a packet detection, enforcement and reporting rule to be installed in the UPF for the PDU session. When the SMF is allocated CN tunnel information, CN tunnel information may be provided to the UPF.

10b) UPF can respond by sending an N4 session establishment/modification response message. When CN tunnel information is allocated by UPF, CN tunnel information may be provided to the SMF.

11) The SMF transmits a Namf_Communication_N1N2MessageTransfer message to the AMF. The Namf_Communication_N1N2MessageTransfer message may include a PDU Session ID, N2 SM information, and N1 SM container.

The N2 SM information includes PDU Session ID, QFI (QoS Flow ID), QoS Profile(s), CN Tunnel Info, S-NSSAI from the Allowed NSSAI, Session-AMBR, PDU Session Type, User Plane Security Enforcement information, UE Integrity. May include Protection Maximum Data Rate.

The N1 SM container may include a PDU session establishment acceptance message.

The PDU session establishment acceptance message may include an authorized QoS rule, SSC mode, S-NSSAI, and an assigned IPv4 address.

12) AMF transmits an N2 PDU session request message to the RAN. The message may include N2 SM information and NAS message. The NAS message may include a PDU session ID and a PDU session establishment acceptance message.

The AMF may transmit a NAS message including a PDU session ID and a PDU session establishment acceptance message. In addition, the AMF includes the received N2 SM information from the SMF in the N2 PDU session request message and transmits it to the RAN.

13) The RAN may exchange specific signaling with the UE related to the information received from the SMF.

The RAN also allocates RAN N3 tunnel information for the PDU session.

The RAN delivers the NAS message provided in step 10 to the UE. The NAS message may include PDU session ID and N1 SM information. The N1 SM information may include a PDU session establishment acceptance message.

The RAN transmits a NAS message to the UE only when necessary RAN resources are set and allocation of RAN tunnel information is successful.

14) The RAN transmits an N2 PDU session response message to the AMF. The message may include PDU session ID, cause, and N2 SM information. The N2 SM information may include a PDU session ID, (AN) tunnel information, and a list of allowed/rejected QoS profiles.

RAN tunnel information may correspond to an access network address of an N3 tunnel corresponding to a PDU session.

15) The AMF may transmit an Nsmf_PDUSession_UpdateSMContext request message to the SMF. The Nsmf_PDUSession_UpdateSMContext request message may include N2 SM information. Here, the AMF may be a transmission of the N2 SM information received from the RAN to the SMF.

16a) If the N4 session for the PDU session has not already been established, the SMF may start the N4 session establishment procedure together with the UPF. Otherwise, the SMF can start the N4 session modification procedure using UPF. SMF may provide AN tunnel information and CN tunnel information. CN tunnel information may be provided only when the SMF selects CN tunnel information in step 8.

16b) The UPF may transmit an N4 session modification response message to the SMF.

17) The SMF transmits an Nsmf_PDUSession_UpdateSMContext Response message to the AMF.

When this process is over, the AMF can deliver the related event to the SMF.

18) The SMF transmits an Nsmf_PDUSession_SMContextStatusNotify message.

19) SMF transmits information to the UE through UPF. Specifically, in the case of PDU Type IPv6, the SMF may generate an IPv6 Router Advertisement and transmit it to the UE through N4 and UPF.

20) If the PDU session establishment is not successful during the procedure, the SMF informs the AMF.

<PDU Session Modification Procedure>

There are two types of PDU (Protocol Data Unit) session modification procedures, as follows:

The PDU session modification procedure initiated by the UE (User Equipment).

The PDU session modification procedure initiated by the network. To this end, the network can send a device trigger message to the applications on the UE.

Figure 7A:
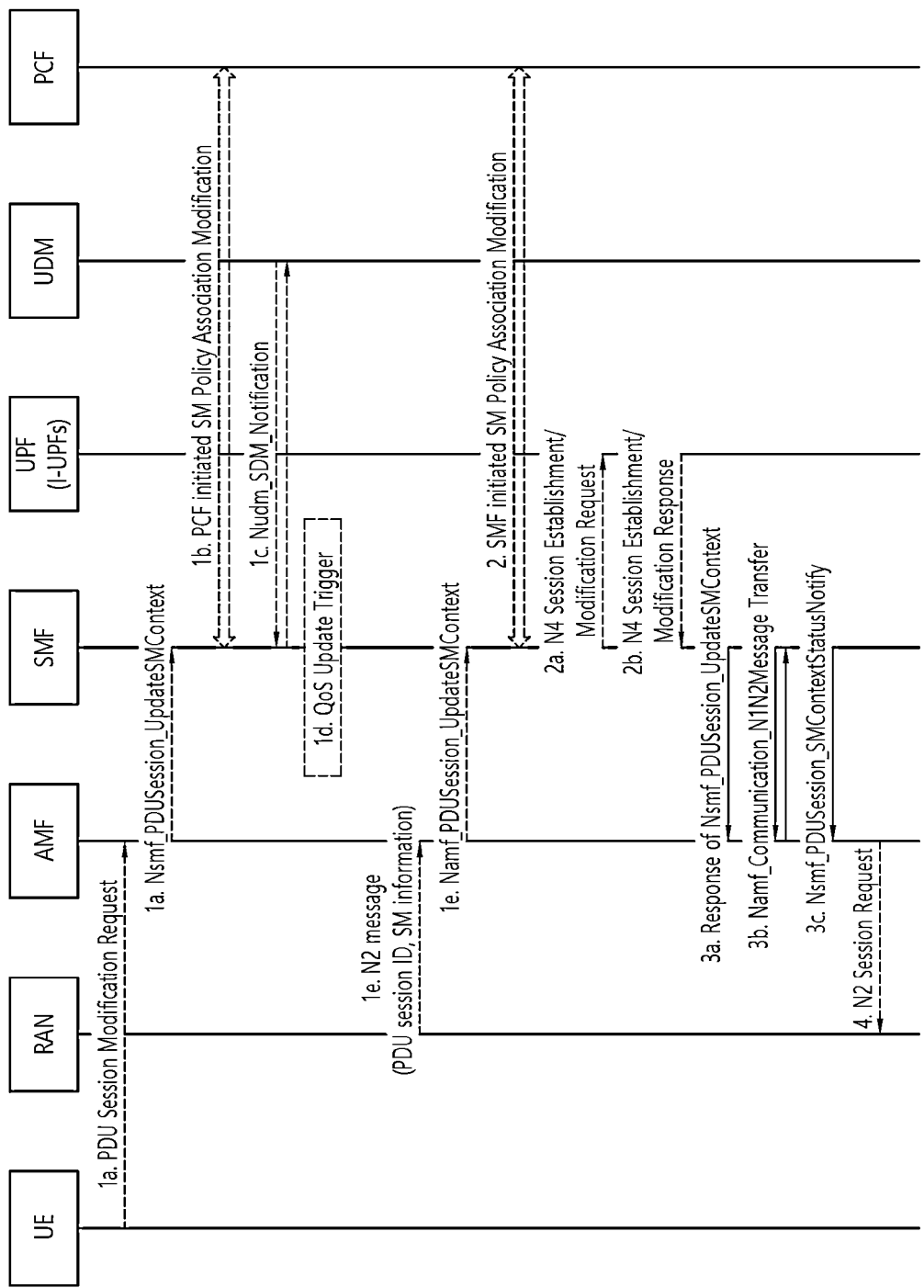
FIGS. 7A and 7B illustrate a procedure for modifying a PDU session.
Figure 7B:
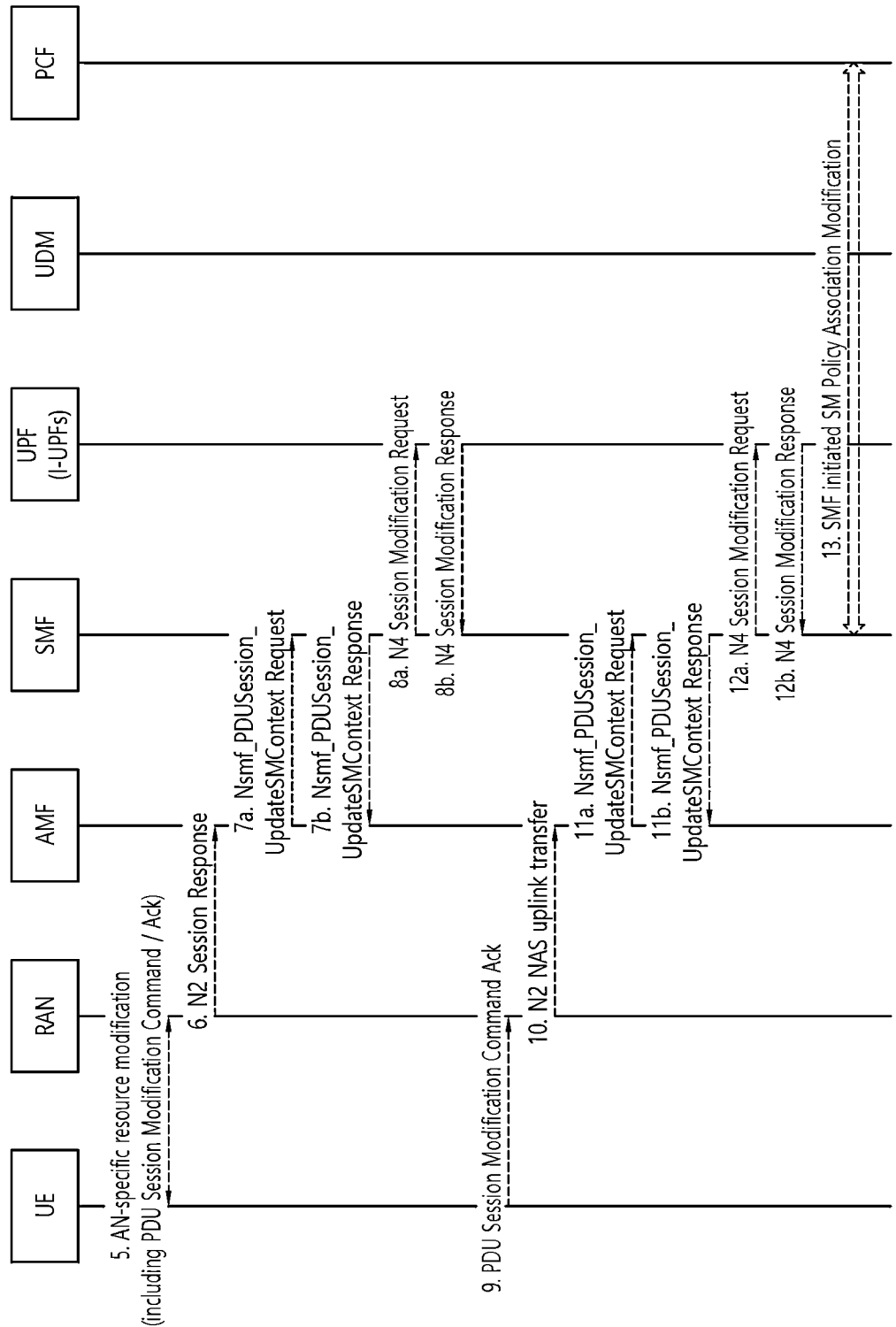

FIGS. 7A and 7B illustrate a procedure for modifying a PDU session.

The PDU Session Modification procedure may be initiated by the UE or by the network.

1a) The UE may initiate the PDU Session Modification procedure by transmitting an NAS message. The NAS message may include an N1 SM container. The N1 SM container may include a PDU Session Modification Request message, a PDU session ID, and information on integrity protection maximum data rate of the UE. The PDU Session Modification Request message may include a PDU session ID, a packet filter, information on requested QoS, 5GSM core network capability, and the number of packet filters. The integrity protection maximum data rate of the UE represents the maximum data rate allowed for the UE to support UP integrity protection. The number of packet filters represents the number of packet filters supported for a QoS rule.

The NAS message is transmitted to an appropriate AMF via the RAN according to the location information of the UE. Then the AMF transmits Nsmf_PDUSession_UpdateSMContext message to the SMF. The message may include a Session Management (SM) context ID and an N1 SM container. The N1 SM container may include a PDU Session Modification Request message.

1b) If the PDU Session Modification procedure is initiated by the PCF among network nodes, the PCF may notify the SMF of a policy change by initiating an SM Policy Association Modification procedure.

1c) If the PDU Session Modification procedure is initiated by the UDM among network nodes, the UDM may update subscription data of the SMF by transmitting Nudm_SDM_Notification message. The SMF may update session management subscription data and transmit an ACK message to the UDM.

1d) If the PDU Session Modification procedure is initiated by the SMF among network nodes, the SMF may trigger a QoS update.

If the PDU Session Modification procedure is triggered according to 1a to 1d cases, the SMF may perform the PDU Session Modification procedure.

1e) If the PDU Session Modification procedure is initiated by the AN among network nodes and AN resources to which a QoS flow is mapped are released, the AN may notify the SMF of the resource release. The AN may transmit an N2 message to the AMF. The N2 message may include a PDU session ID and N2 SM information. The N2 SM information may include QFI, user location information, and an indication indicating release of a QoS flow. The AMF may transmit Nsmf_PDUSession_UpdateSMContext message. The message may include an SM context ID and N2 SM information.

2) The SMF may transmit a report on a subscription event by performing an SM Policy Association Modification procedure. If the PDU Session Modification procedure is triggered by 1b to 1d cases, this step may be skipped. If dynamic PCC is not deployed over the network, the SMF may apply an internal policy to determine the change of the QoS profile.

The steps 3 to 7 described below may not be performed when the PDU Session Modification procedure requires only the operation of the UPF.

3a) If the UE or the AN initiates the PDU Session Modification procedure, the SMF may respond to the AMF by transmitting Nsmf_PDUSession_UpdateSMContext message. The message may include N2 SM information and an N2 SM container. The N2 SM information may include a PDU session ID, QFI, a QoS profile, and a session-AMBR. The N1 SM container may include a PDU session modification command. The PDU session modification command may include a PDU session ID, a QoS rule, a QoS rule operation, QoS parameters at QoS flow level, and a session-AMBR.

The N2 SM information may include information that the AM has to transmit to the AN. The N2 SM information may include QFI and a QoS profile to notify the AN that one or more QoS flows are added or modified. If PDU session modification is requested by a UE for which user plane resources are not configured, the N2 SM information to be transmitted to the AN may include information for establishment of user plane resources.

The N1 SM container may include a PDU Session Modification command to be transmitted to the UE by the AMF. The PDU Session Modification command may include a QoS rule and QoS parameters at QoS flow level.

3b) If the PDU Session Modification procedure is initiated by the SMF, the SMF may transmit Namf_Communication_N1N2MessageTransfer message. The message may include N2 SM information and an N1 SM container. The N2 SM information may include a PDU session ID, QFI, a QoS profile, and a session-AMBR. The N1 SM container may include a PDU session modification command. The PDU session modification command may include a PDU session ID, a QoS rule, and QoS parameters at QoS flow level.

If the UE is in the CM-IDLE state and ATC is in the active state, the AMF may skip steps 3 to 7 described below after updating and storing UE context based on the Namf_Communication_N1N2MessageTransfer message. If the UE enters a reachable state, namely, CM-CONNECTED state, the AMF may transmit an N1 message to synchronize the UE with the UE context.

4) The AMF may transmit an N2 PDU Session Request message to the AN. The N2 PDU Session Request message may include the N2 SM information and the NAS message received from the SMF. The NAS message may include a PDU session ID and an N1 SM container. The N1 SM container may include a PDU session modification command.

5) The AN performs AN signaling exchange with a UE associated with the information received from the SMF. For example, in the case of NG-RAN, to modify required AN resources associated with the PDU session, an RRC Connection Reconfiguration procedure may be performed in conjunction with the UE.

6) The AN transmits an N2 PDU session ACK message in response to the received N2 PDU session request. The N2 PDU session ACK message may include N2 SM information and user location information. The N2 SM information may include a list of accepted/rejected QFI, AN tunnel information, and an PDU session ID.

7) The AMF transmits the N2 SM information and the user location information received from the AN through Nsmf_PDUSession_UpdateSMContext message. Then the SMF transmits Nsmf_PDUSession_UpdateSMContext message to the AMF.

8) The SMF transmits an N4 Session Modification Request message to the UPF to update the N4 session of the UPF included in the PDU Session Modification command.

If a new QoS flow is generated, the SMF updates an UL packet detection rule of the new QoS flow together with the UPF.

9) The UE transmits an NAS message in response to the reception of the PDU Session Modification command. The NAS message may include a PDU session ID and an N1 SM container. The N1 SM container may include a PDU Session Modification command ACK.

10) The AN transmits the NAS message to the AMF.

11) The AMF may transmit the N1 SM container and the user location information received from the AN to the SMF through Nsmf_PDUSession_UpdateSMContext message. The N1 SM container may include a PDU Session Modification command ACK. The SMF may transmit Nsmf_PDUSession_UpdateSMContext Response message to the AMF.

12) The SMF transmits an N4 Session Modification Request message to the UPF to update the N4 session of the UPF included in the PDU Session Modification command. The message may include an N4 session ID.

13) When the SMF interacts with the PCF during the step 1b or 2, the SMF may notify the PCF of whether a PCC decision may be performed or not via the SM Policy Association Modification procedure.

The SMF may notify an entity which has requested the user location information related to PDU session modification.

<Network Slicing>

Figure 8A:
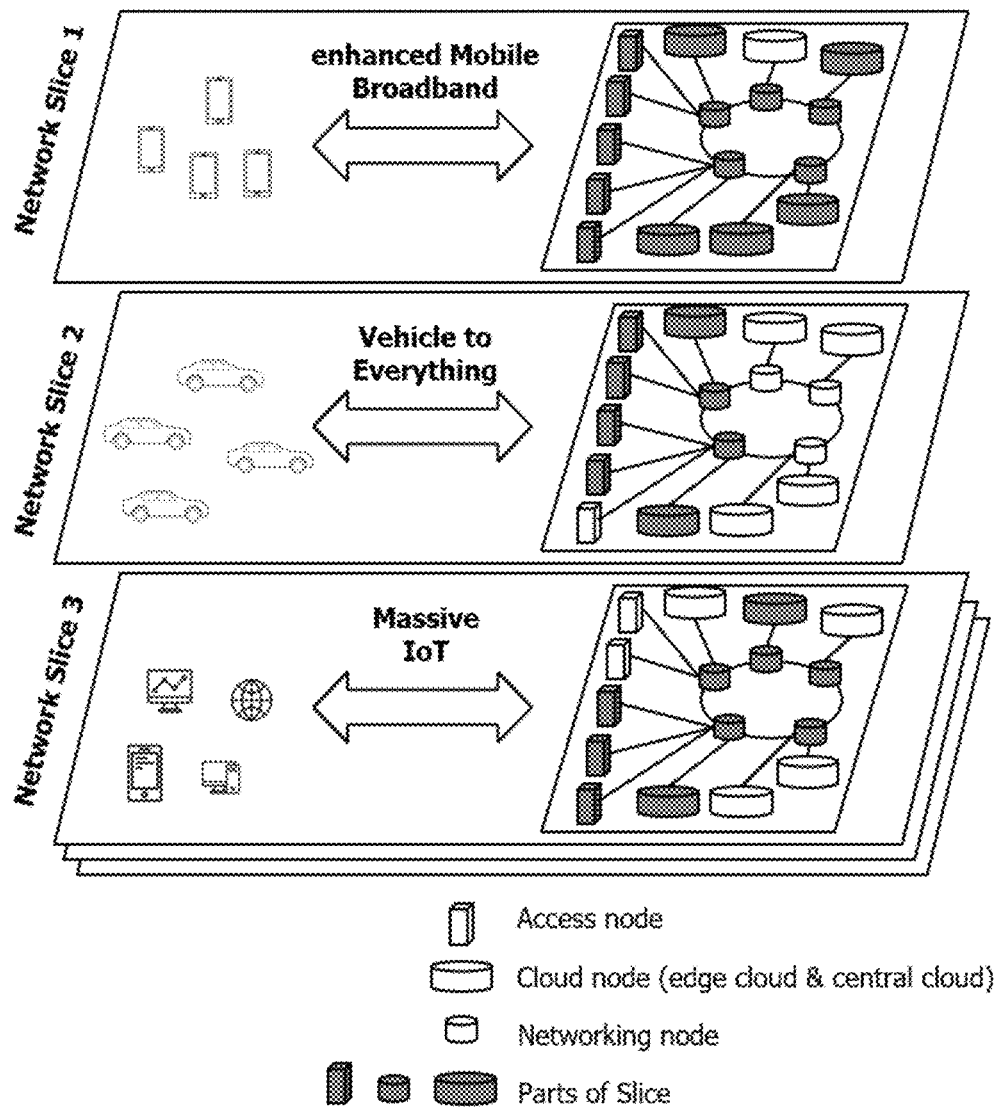
FIG. 8a is an example diagram explaining the concept of network slicing.

FIG. 8A is an example diagram explaining the concept of network slicing.

Network slicing refers to dividing a single physical network into multiple virtual networks.

Each divided network can be operated in a customized and optimized manner for specific applications or subscriber types. Based on cloud computing and virtualization technologies, shared physical network resources can be dynamically and efficiently scheduled to logical network slices according to changes in user demands.

A 5G network slice consists of a set of network functions and configurations for specific use cases or business models.

As shown in FIG. 7, Network Slice 1 represents enhanced Mobile Broadband (eMBB), Network Slice 2 represents Vehicle-to-Everything (V2X), and Network Slice 3 represents Massive IoT (MIoT), illustrating an example of 5G network slicing.

A network slice can span several domains, including distributed cloud infrastructure, transport networks, radio access networks, and core networks. The basic principle of 5G network slice design is to provide only the customized functions required to handle traffic for specific use cases. Network slices are equipped with the capabilities to adapt to changing requirements with necessary customized capabilities.

Meanwhile, according to the NGMN (Next Generation Mobile Networks) definition, network slicing consists of three layers: the Service Instance Layer, the Network Slice Instance Layer, and the Resource Layer. The Service Instance Layer represents end-user services, with each service represented as a Service Instance. The Network Slice Instance Layer includes provided network slice instances, supplying network characteristics required by the service instance. The Resource Layer provides all virtual or physical resources and network functions necessary to create a network slice instance.

In the Internet Engineering Task Force (IETF) Deterministic Networking (DetNet) Working Group, network slicing in 3GPP 5G mobile networks operates based on the Core Network (CN), and it fundamentally functions based on Network Slice Instance information. A Network Slice Instance refers to a set of resources and Network Function Instances required to form a network slice. A single network slice may be available across the entire Public Land Mobile Network (PLMN) or in one or several Tracking Areas (TAs). A Network Slice Instance may be associated with one or multiple Single-Network Slice Selection Assistance Information S-NSSAIs), and conversely, a single S-NSSAI may be associated with one or multiple Network Slice Instances.

In a 3GPP 5G mobile network, a network slice is identified by a single S-NSSAI. The S-NSSAI consists of an Slice/Service Type (SST) and an Slice Differentiator (SD), where the SST must be included in the S-NSSAI, while the SD is optional and may or may not be included. Currently, the 3GPP technical specifications define a total of six standard SST types and values, as shown in Table 3.

TABLE 3

| Slice/Service Type | SST value |
| --- | --- |
| eMBB | 1 |
| (enhanced Mobile Broadband) | |
| URLLC | 2 |
| (Ultra-Reliable Low | |
| Latency Communications) | |
| MIoT | 3 |
| (massive IoT) | |
| V2X | 4 |
| (Vehicle to Everything) | |
| HMTC* | 5 |
| (High-performance Machine- | |
| Type Communications) | |
| (*since Rel-17 onwards) | |
| HDLLC ** | 6 |
| (High Data rate and Low | |
| Latency Communications) | |
| (**since Rel-18 onwards) | |

Meanwhile, one or more sets of S-NSSAIs are referred to as NSSAI (Network Slice Selection Assistance Information). During the registration process in the 5G mobile network, the UE (User Equipment) uses NSSAI to request network slice connectivity to the core network, and the core network is responsible for the authentication and authorization of such network slice connectivity requests from the UE.

The UE may be configured with or store various types of NSSAI information provided by the 5G core network. Configured NSSAI refers to NSSAI that is provided and set by the serving PLMN, while Default Configured NSSAI is the NSSAI provided and set by the Home PLMN. The Requested NSSAI is the NSSAI used by the UE when requesting connectivity to a specific network slice from the core network. Allowed NSSAI is the NSSAI that signifies the core network's permission for the UE to connect to a specific network slice. Additionally, Subscribed S-NSSAI refers to the S-NSSAI included in the subscriber information.

The UE may have a Default Configured NSSAI pre-set and stored, or it may be provided or updated by the core network. Each S-NSSAI within the Default Configured NSSAI corresponds to an S-NSSAI in the subscriber NSSAI. The S-NSSAI in the Requested NSSAI of the UE refers to the S-NSSAI that was previously configured by the network or is within the Allowed NSSAI. In general, the NSSAI or S-NSSAI that the UE uses is the one previously configured or allowed by the network.

Meanwhile, during the registration process, the UE (User Equipment) and the 5G mobile network provide or utilize NSSAI information to support and manage network slice connectivity. Initially, the UE generally holds a Configured NSSAI, which is preset and stored, as well as an Allowed NSSAI previously approved by the network. If there is no Allowed NSSAI from the network, there may be no Allowed NSSAI stored. When the UE requests connection to a specific network slice during the registration procedure, it includes the Requested NSSAI information in the Registration Request message sent to the network. At this time, if the UE does not have stored Configured NSSAI or Allowed NSSAI information-meaning there is no available Configured NSSAI—this implies the use of the default Configured NSSAI information. If there is no stored Allowed NSSAI, but a usable Configured NSSAI is stored, the Configured NSSAI is used as the Requested NSSAI information. Finally, if an Allowed NSSAI is stored and available, the Allowed NSSAI is used as the Requested NSSAI information. After checking the Requested NSSAI included in the Registration Request message sent by the UE, the core network responds to the UE with a Registration Accept message that includes Configured NSSAI, Allowed NSSAI, and Rejected NSSAI information. The UE stores the Configured NSSAI, Allowed NSSAI, and Rejected NSSAI information provided in the Registration Accept message from the network, and uses this information for subsequent network slice connection requests. Since Rejected NSSAI refers to NSSAI information that the network has declined for use, the UE fundamentally does not use the Rejected NSSAI. Through this registration request procedure, the UE and the network mutually provide and manage NSSAI information to support and manage network slice connectivity.

Additionally, when the UE (User Equipment) sends a PDU session establishment request message to the network for data transmission, it includes the S-NSSAI information for the network slice that the application related to data transmission intends to connect to, based on the stored Allowed NSSAI. If there are no issues with the S-NSSAI information included in the PDU session establishment request message sent by the UE, the network will respond with an acceptance.

Moreover, if there are changes to network slicing-related information, including NSSAI, due to updates in subscriber information or mobile network policies, the network can inform the UE of the updated NSSAI information. In this case, the network can provide the updated NSSAI information to the UE via the Generic UE Configuration Update procedure. To do this, the AMF (Access and Mobility Management Function) sends the updated Configured NSSAI, Allowed NSSAI, and Rejected NSSAI information in a Configuration Update Command message to the UE. The UE then updates and stores the provided Configured, Allowed, and Rejected NSSAI information. Subsequently, the UE uses the updated NSSAI information to perform network slice connection requests.

In the recent 3GPP Release 18 standard, an Alternative S-NSSAI has been defined. This refers to an S-NSSAI (e.g., S-NSSAI #1) that can be replaced with a compatible/alternative S-NSSAI (e.g., S-NSSAI #2) from the existing Allowed NSSAI when the original S-NSSAI becomes unavailable or congested. When an S-NSSAI (e.g., S-NSSAI #1) becomes unavailable or congested in the network, a compatible or alternative S-NSSAI, that is, the Alternative S-NSSAI, is provided to the UE and updated. At this time, the Generic UE Configuration Update procedure can be used to provide and update the Alternative S-NSSAI to the UE.

On another note, in the 3GPP Release 18 standard, a Partially Allowed NSSAI has been defined. The Allowed NSSAI refers to the NSSAI that indicates to the UE that network slicing services related to the requested NSSAI are permitted by the network (AMF and/or SMF) in the UE's registered area (Registration Area). The Allowed NSSAI applies to the PLMN or all TA lists within the Registration Area where the UE is registered. In contrast, the Partially Allowed NSSAI applies to the PLMN or certain TA lists within the Registration Area. Thus, in some TAs within the registered area, network slicing services associated with the Partially Allowed NSSAI (e.g., Partially Allowed NSSAI #1, specifically S-NSSAI #1) are allowed, whereas in other TAs, network slicing services associated with this Partially Allowed NSSAI (e.g., Partially Allowed NSSAI #1, specifically S-NSSAI #1) are not permitted. This Partially Allowed NSSAI information is provided and updated through the Registration Procedure or the Generic UE Configuration Update Procedure.

<Disclosure of the Present Specification>

Figure 8B:
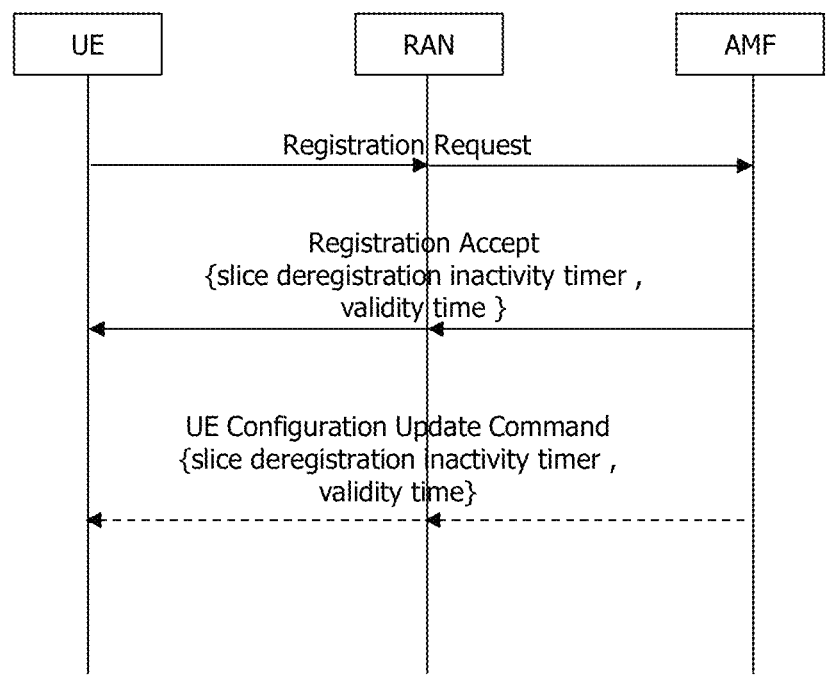
FIG. 8B is a flowchart according to an embodiment of this specification.

FIG. 8B is a flowchart according to an embodiment of this specification.

Referring to FIG. 8B, the UE transmits a registration request message.

At this time, the UE may include the UE MM Core Network Capability in the registration request message and transmit it. The UE MM Core Network Capability may include information indicating support for the UE configuration of network-controlled Slice Usage Policy. Alternatively, the UE MM Core Network Capability may include information indicating support for temporarily available network slices.

The UE receives a Registration Accept message. Alternatively, the UE may receive a UE Configuration Update Command.

The Registration Accept message or the UE Configuration Update Command message may include one or more of the slice deregistration inactivity timer and the validity time for one or more S-NSSAIs.

Then, the UE may activate a first timer based on the slice deregistration inactivity timer.

Additionally, the UE may activate a second timer based on the validity time.

If the first timer expires, the UE may remove the S-NSSAI from the Allowed NSSAI.

If the Allowed NSSAI becomes empty after the second timer expires and the UE does not trigger a Mobility Registration Update procedure, the UE will implicitly enter a deregistered state.

The slice deregistration inactivity timer is set per access type.

Summary of the Embodiments of this Specification

I. UE Configuration of Network-Controlled Slice Usage Policy

The UE during the Registration procedure may indicate in UE MM Core Network Capability that it supports UE configuration of network-controlled Slice Usage Policy. If so, the AMF determines Slice Usage Policy for one (or more) Network Slice(s) for the UE and configures the UE with this information together with Configured NSSAI to control the usage of this (or these) Network Slice(s). The AMF may be locally configured with network Slice Usage Policy, or receive the policy from the AM-PCF, or per the information received from UDM for AF managed timer values.

The network-controlled Slice Usage Policy is provided to the UE in the Registration Accept or the UE Configuration Update Command and may include:

An indication, for one or more of S-NSSAI(s) of the HPLMN in the Configured NSSAI, whether the UE only registers with the Network Slice with the network when applications in the UE require data transmission in the Network Slice (i.e. the UE can only register the Network Slice only on demand and consider the Network Slice as on demand S-NSSAI).

Optionally, for on demand S-NSSAI(s) of the HPLMN in the Configured NSSAI, a slice deregistration inactivity timer per access type that causes the UE to deregister the Network Slice. Regarding the slice deregistration inactivity timer, following applies:
a. the UE and AMF start the timer when one of the following conditions occur: 1) the Network Slice is added to the Allowed NSSAI and there are no PDU Sessions associated with the Network Slice over the corresponding access type and 2) the last PDU Session associated with the Network Slice over the same access type is released.
b. the UE and AMF stop the timer and reset when at least one PDU Session associated with the Network Slice is successfully established or the Network Slice is removed from the Allowed NSSAI.
c. when the slice deregistration inactivity timer for a Network Slice over an access type expires, the UE and AMF locally remove the S-NSSAI from the Allowed NSSAI.

If the UE and network state became misaligned, the UE may, for example, request connectivity in a Network Slice which is no longer allowed. In this case, the AMF shall provide the updated Allowed NSSAI in a UE Configuration Update Command after rejecting the PDU Session establishment. The UE may then re-register with the Network Slice if needed.

The UE stores the received Slice Usage Policy with the Configured NSSAI for the serving PLMN and this is kept stored for as long as a Configured NSSAI remains stored for the PLMN.

When the Configured NSSAI is updated, the AMF may also provide a new Slice Usage Policy to the UE.

2. Optimized Handling of Temporarily Available Network Slices

A network slice may be available for all UEs or a limited number of UEs only for a limited time that is known at the network in advance e.g. by OAM or subscription. The limited time duration may be due to, for example, the fact that network slice is only temporarily or periodically active in the deployment (e.g. for a limited time to serve an event or a UE may be only authorized to access the network slice for a limited time known in advance), or the network slice is being decommissioned at a known future time. This feature is enabled by S-NSSAI validity time that the network and the UE can handle to reduce the signalling load associated to the transitions in RM and SM states for the network slice.

The UE may indicate its support for temporarily available network slices in the UE MM Core Network Capability (see clause 5.4.4a) in the Registration Request. The AMF, based on OAM configuration or information received from the UDM or NSSF, may indicate to a supporting UE the validity time for one or more S-NSSAIs in the Configured NSSAI in the Registration Accept message or via the UE Configuration Update procedure. In roaming case, the AMF my include the validity time for an S-NSSAI in the Configured NSSAI either because of limited availability of the VPLMN S-NSSAI or the mapped S-NSSAI of the HPLMN.

If a supporting UE is configured with validity time for an S-NSSAI:

a) If the validity time indicates the S-NSSAI is available, the UE may request the S-NSSAI in a Requested NSSAI in a Registration request and, if the S-NSSAI is included in the Allowed NSSAI or in the Partially Allowed NSSAI, the UE may establish PDU sessions associated with the S-NSSAI.

b) If the validity time indicates the S-NSSAI is not available

The UE shall not include the S-NSSAI in the Requested NSSAI for any Access Types regardless of the validity time information was received;

If the S-NSSAI is already part of the Allowed NSSAI or Partially Allowed NSSAI, the UE shall remove the S-NSSAI from the locally stored Allowed NSSAI or Partially Allowed NSSAI and the UE shall also locally release any PDU sessions associated with the S-NSSAI.

If the validity time indicates the S-NSSAI will not be available again, the UE shall remove the S-NSSAI from the locally stored Configured NSSAI.

If a UE supporting temporary available network slices only got one S-NSSAI in the Allowed NSSAI with a validity time that is about to expire, and does not have any Pending NSSAI, then the UE may trigger a Mobility Registration Update to register with any other S-NSSAI in the Configured NSSAI which is still available, if any, and if UE does not trigger Mobility Registration Update and Allowed NSSAI becomes empty after expiry of validity time, then the UE shall enter RM-DEREGISTERED state implicitly.

For a supporting UE, if validity time applies to an S-NSSAI, an AMF supporting temporarily available network slices shall:

- If the S-NSSAI is provided in a Requested NSSAI in a Registration Request by the UE and the validity time indicates the S-NSSAI is not available, but it is going to become available again (i.e. the UE is detected as not having up to date validity time), then the AMF sends the Configured NSSAI to the UE including the validity time for the S-NSSAI in the Registration Accept message. If the validity time indicates the S-NSSAI is not available and will not become available again, then the AMF sends the Configured NSSAI to the UE, excluding the S-NSSAI from the Configured NSSAI.
- If the S-NSSAI is in the Allowed NSSAI or the Partially Allowed NSSAI for the UE and the validity time indicates that the S-NSSAI is not available, then locally remove (i.e. without sending any signalling to the UE) the S-NSSAI from the Allowed NSSAI or Partially Allowed NSSAI. If there is any PDU session established for the S-NSSAI, the AMF requests the SMF to release the PDU session:
- If the UE is in CM-CONNECTED state, the AMF releases the PDU session for the S-NSSAI by sending to the SMF, a Nsmf_PDUSession_UpdateSMContext Request with a release indication to request the release of the PDU Session and then the AMF forwards the N2 SM request to release the AN resources associated with the PDU session
- If the UE is in CM-IDLE state, the AMF locally releases the PDU session without paging the UE and causes the SMF to locally release the SM context for the UE by a Nsmf_PDUSession_ReleaseSMContext. The PDU Session status is synchronized at next time when the UE connects to the network.
- If there is no S-NSSAI present in the Allowed NSSAI or Partially Allowed NSSAI after AMF removes the S-NSSAI locally after expiry of validity time AMF shall enter RM-DEREGISTERED state for the UE implicitly.

Figure 9:
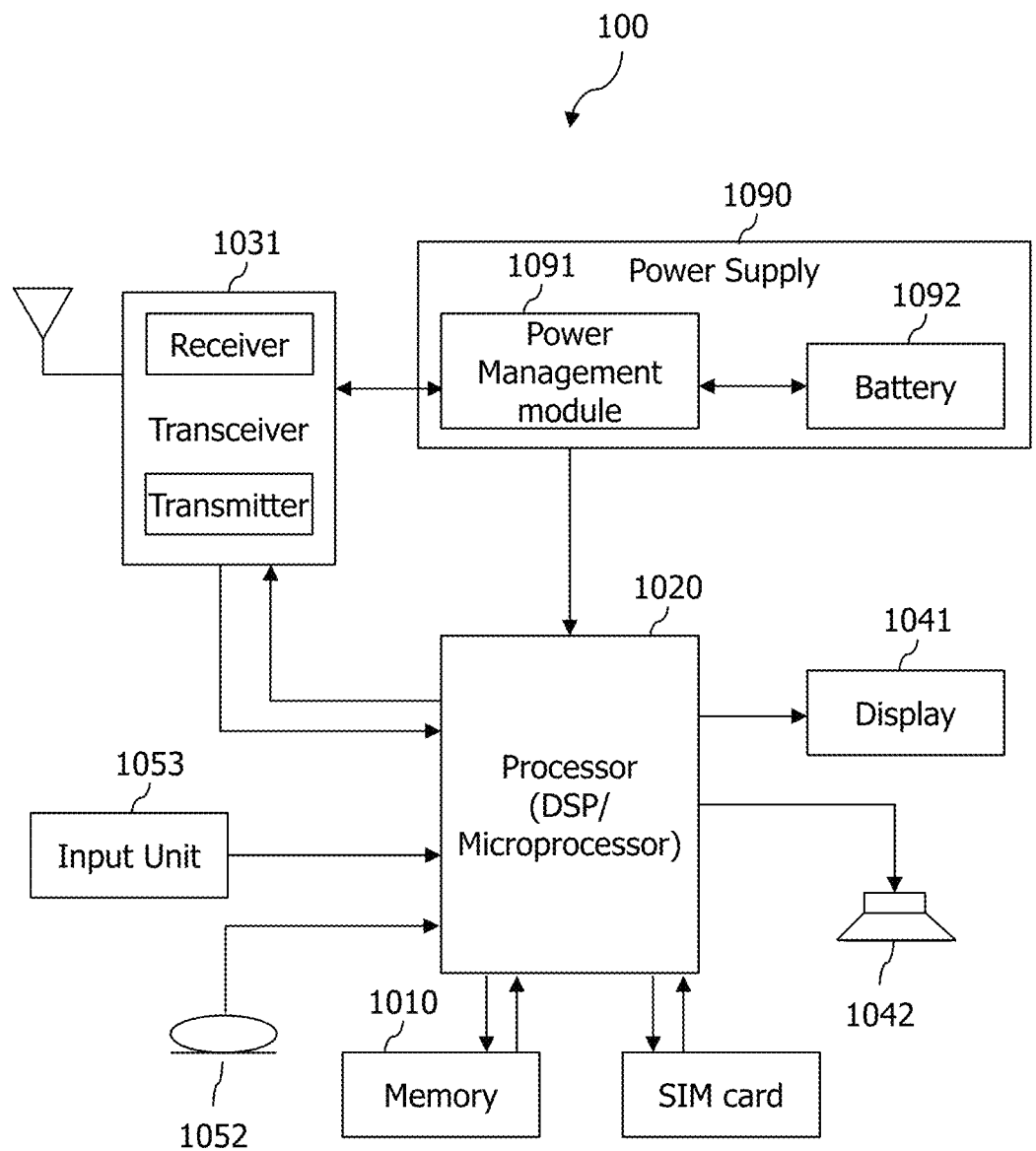
FIG. 9 is a block diagram showing a structure of a UE 100 according to an embodiment.

FIG. 9 is a block diagram showing a structure of a UE 100 according to an embodiment.

A UE 100 includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed functions, procedures, and/or methods described in the present specification. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various well-known means.

The transceiver 1031 is operatively coupled to the processor 1020, and transmits and/or receives a radio signal. The transceiver 1031 includes a transmitter and a receiver. The transceiver 1031 may include a baseband signal for processing a radio frequency signal. The transceiver controls one or more antennas to transmit and/or receive a radio signal. In order to initiate communication, the processor 1020 transfers command information to the transceiver 1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like.

The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

Figure 10:
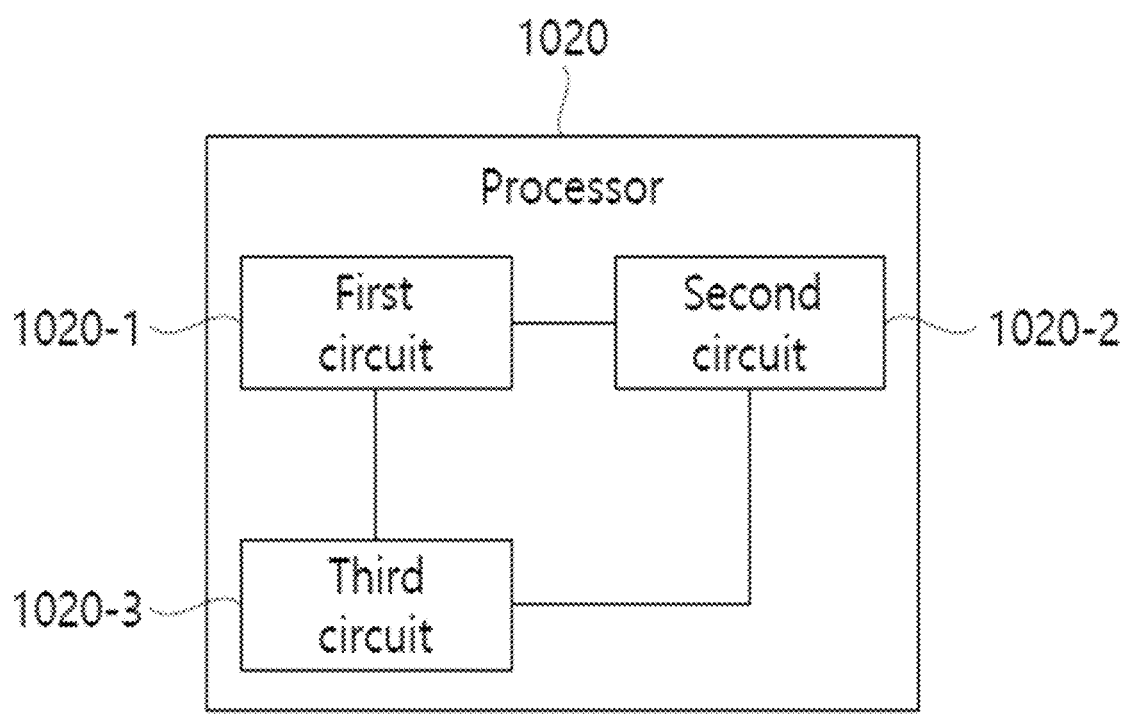
FIG. 10 illustrates a block diagram of a processor in which the present disclosure is implemented.

FIG. 10 illustrates a block diagram of a processor in which the present disclosure is implemented.

As may be seen from FIG. 9, the processor 1020 in which the present disclosure is implemented may include a plurality of circuitry to implement functions, procedures and/or methods described in the present disclosure. For example, the processor 1020 may include a first circuit 1020-1, a second circuit 1020-2, and a third circuit 1020-3. Also, although not shown in the figure, the processor 1020 may include more circuits. Each circuit may include a plurality of transistors.

The first circuit 1020-1 may receive, via the transceiver, a Registration Accept message or UE Configuration Update Command message. The Registration Accept message or UE Configuration Update Command message may include at least one of a slice deregistration inactivity timer and validity time for one or more Single Network Slice Selection Assistance Information (S-NSSAI).

The second circuit 1020-2 may start a first timer based on the slice deregistration inactivity timer.

If the first timer expires, the third circuit 1020-3 may locally remove the S-NSSAI from the Allowed NSSAI.

If the UE does not trigger a Mobility Registration Update and an Allowed NSSAI becomes empty after expiry of the validity time, then the UE enters deregistered state implicitly.

The processor 1020 may be called Application-Specific Integrated Circuit (ASIC) or Application Processor (AP) and may include at least one of a Digital Signal Processor (DSP), a Central Processing Unit (CPU), and a Graphics Processing Unit (GPU).

The processor may be equipped in the UE.

In the above, preferred embodiments have been described by way of example, but the disclosure of the present specification is not limited to these specific embodiments, and may be modified, changed, or modified in various forms within the scope described in the spirit and claims of the present specification. It can be improved.

In the example system described above, the methods are described on the basis of a flow chart as a series of steps or blocks, but the order of steps described is not limited, and some steps may occur simultaneously or in a different order than other steps as described above. there is. Additionally, those skilled in the art will understand that the steps shown in the flowchart are not exclusive and that other steps may be included or one or more steps in the flowchart may be deleted without affecting the scope of rights.

The claims set forth herein may be combined in various ways. For example, the technical features of the method claims of this specification may be combined to implement a device, and the technical features of the device claims of this specification may be combined to implement a method. Additionally, the technical features of the method claims of this specification and the technical features of the device claims may be combined to implement a device, and the technical features of the method claims of this specification and technical features of the device claims may be combined to implement a method.

What is claimed is:

1. A method performed by a user equipment (UE) and comprising:
   receiving a Registration Accept message or UE Configuration Update Command message, wherein the Registration Accept message or UE Configuration Update Command message includes at least one of a slice deregistration inactivity timer and validity time for one or more Single Network Slice Selection Assistance Information (S-NSSAI); and
   starting a first timer based on the slice deregistration inactivity timer, wherein when the first timer expires, the UE locally removes the S-NSSAI from the Allowed NSSAI, and wherein when the UE does not trigger a Mobility Registration Update and an Allowed NSSAI becomes empty after expiry of the validity time, the UE enters deregistered state implicitly.

2. The method of claim 1, wherein the slice deregistration inactivity timer is set per access type.

3. The method of claim 1,
   wherein the first timer based on the slice deregistration inactivity timer is started a) when the Network Slice is added to the Allowed NSSAI and there are no Protocol data unit (PDU) Sessions associated with the Network Slice over a corresponding access type or b) when a last PDU Session associated with the Network Slice over a same access type is released.

4. The method of claim 1, further comprising:
   stopping or resetting the first timer when at least one PDU Session associated with the Network Slice is successfully established or the Network Slice is removed from the Allowed NSSAI.

5. A user equipment (UE) comprising:
   a transceiver;
   a processor; and memory storing instructions that, when executed by the processor, cause the UE to perform operations comprising:
   receiving a Registration Accept message or UE Configuration Update Command message, wherein the Registration Accept message or UE Configuration Update Command message includes at least one of a slice deregistration inactivity timer and validity time for one or more Single Network Slice Selection Assistance Information (S-NSSAI); and starting a first timer based on the slice deregistration inactivity timer, wherein when the first timer expires, the UE locally removes the S-NSSAI from the Allowed NSSAI, and wherein when the UE does not trigger a Mobility Registration Update and an Allowed NSSAI becomes empty after expiry of the validity time, the UE enters deregistered state implicitly.

6. The UE of claim 5, wherein the slice deregistration inactivity timer is set per access type.

7. The UE of claim 5,
   wherein the first timer based on the slice deregistration inactivity timer is started a) when the Network Slice is added to the Allowed NSSAI and there are no Protocol data unit (PDU) Sessions associated with the Network Slice over a corresponding access type or b) when a last PDU Session associated with the Network Slice over a same access type is released.

8. The UE of claim 5, wherein the processor is further configured to:
   stop or reset the first timer when at least one PDU Session associated with the Network Slice is successfully established or the Network Slice is removed from the Allowed NSSAI.

9. A semiconductor chipset equipped into a user equipment (UE), comprising:
   at least one processor;
   and at least one memory storing instructions that, when executed by the at least one processor, cause the UE to perform operations comprising:
   receiving a Registration Accept message or UE Configuration Update Command message, wherein the Registration Accept message or UE Configuration Update Command message includes at least one of a slice deregistration inactivity timer and validity time for one or more Single Network Slice Selection Assistance Information (S-NSSAT); and
   starting a first timer based on the slice deregistration inactivity timer,
   wherein when the first timer expires, the UE locally removes the S-NSSAI from the Allowed NSSAI, and wherein when the UE does not trigger a Mobility Registration Update and an Allowed NSSAI becomes empty after expiry of the validity time, the UE enters deregistered state implicitly.

10. The semiconductor chipset of claim 9, wherein the slice deregistration inactivity timer is set per access type.

11. The semiconductor chipset of claim 9,
wherein the first timer based on the slice deregistration inactivity timer is started a) when the Network Slice is added to the Allowed NSSAI and there are no Protocol data unit (PDU) Sessions associated with the Network Slice over a corresponding access type or b) when a last PDU Session associated with the Network Slice over a same access type is released.

12. The semiconductor chipset of claim 9, wherein the operation further comprise:
stopping or resetting the first timer when at least one PDU Session associated with the Network Slice is successfully established or the Network Slice is removed from the Allowed NSSAI.

* * * * *